US008712317B2

(12) United States Patent
Cloud et al.

(10) Patent No.: US 8,712,317 B2
(45) Date of Patent: Apr. 29, 2014

(54) METHOD FOR FACILITATING ASSESSMENT OF A COURSEWORK ANSWER AND MODERATING THE ASSESSMENT

(75) Inventors: Pilar Michelle Cloud, Weybridge (GB); Karim David Derrick, London (GB)

(73) Assignee: Sherston Software Limited, Malmesbury (GB)

(*) Notice: Subject to any disclaimer, the term of this patent is extended or adjusted under 35 U.S.C. 154(b) by 219 days.

(21) Appl. No.: 13/059,005

(22) PCT Filed: Aug. 4, 2009

(86) PCT No.: PCT/GB2009/050974
§ 371 (c)(1),
(2), (4) Date: Feb. 14, 2011

(87) PCT Pub. No.: WO2010/018393
PCT Pub. Date: Feb. 18, 2010

(65) Prior Publication Data
US 2011/0143327 A1    Jun. 16, 2011

(30) Foreign Application Priority Data

Aug. 12, 2008 (GB) .................................. 0814707.6
Mar. 10, 2009 (GB) .................................. 0904097.3

(51) Int. Cl.
*G09B 7/00* (2006.01)
(52) U.S. Cl.
USPC .......................................... 434/353; 715/230
(58) Field of Classification Search
USPC .......... 434/323, 350, 353, 322, 362; 715/230, 715/232, 233, 229
See application file for complete search history.

(56) References Cited

U.S. PATENT DOCUMENTS

| | | | | |
|---|---|---|---|---|
| 5,991,595 A * | 11/1999 | Romano et al. | ............... | 434/353 |
| 6,749,435 B2 * | 6/2004 | Clark et al. | ................... | 434/322 |
| 7,432,938 B1 * | 10/2008 | Reuter et al. | .................. | 345/619 |
| 7,844,891 B2 * | 11/2010 | Chandra | ....................... | 715/208 |
| 7,913,162 B2 * | 3/2011 | Hansen et al. | ................. | 715/230 |
| 2003/0023642 A1 * | 1/2003 | Spragins | ....................... | 707/530 |
| 2003/0165804 A1 * | 9/2003 | Jongsma et al. | ............. | 434/353 |
| 2005/0160357 A1 * | 7/2005 | Rivette et al. | ................. | 715/512 |
| 2006/0115802 A1 * | 6/2006 | Reynolds | ...................... | 434/236 |
| 2010/0131856 A1 * | 5/2010 | Kalbfleisch et al. | .......... | 715/741 |
| 2010/0241968 A1 * | 9/2010 | Tarara et al. | .................. | 715/751 |

FOREIGN PATENT DOCUMENTS

| | | |
|---|---|---|
| EP | 1 585 086 A1 | 10/2005 |
| EP | 1 672 529 A2 | 6/2006 |
| EP | 1 672 529 A3 | 4/2007 |
| JP | 2002055593 A | 2/2002 |
| WO | 98/43223 A1 | 10/1998 |
| WO | 01/90928 A1 | 11/2001 |

* cited by examiner

*Primary Examiner* — Peter Egloff
(74) *Attorney, Agent, or Firm* — Lewis, Rice & Fingersh, L.C.

(57) ABSTRACT

A method for facilitating assessment of an answer to a coursework question and moderating the assessment, the method comprising the steps of displaying at least part of a representation of a coursework answer on a display of a computer, displaying a list of learning outcome statements, selecting a learning outcome statement from the list of learning outcome statements and placing the learning outcome statement on the representation of the coursework answer at a location evidencing fulfillment of the learning outcome statement.

24 Claims, 21 Drawing Sheets

Karim's portfolio

TAG Learning Demo LEA

← back

Learning Outcomes

Outcome 1    Evidence of working within Level 2
- Target
  - *I can use a spreadsheet
  - *I can fill data into a spreadsheet made by my teacher
  - *I know about cells and naming them
  - *I can talk about what the spreadsheet does Outcome 2    Evidence of working within Level 3
- Target
  - *I can use a spreadsheet to work out sums
  - *I can change data in spreadsheets to answer questions.
  - *I can explain why I made changes to the spreadsheet Outcome 3    Evidence of working within Level 4
- Target
  - *I designed a spreadsheet with calculations
  - *I can use SUM to add up a set of numbers
  - *I can alter the calculations in a spreadsheet.
  - *I can tell you what will happen if I make changes to the spreadsheet.

Checklist overview: Party Planner

231 — Objective

I can use a spreadsheet (2 Files attached)

Evidence of working within Level 2

229 — I can fill data into a spreadsheet by my teacher (1 File attached)

I know about cells and naming them (1 File attached)

230 — I can talk about what the spreadsheet does. (1 File attached)

Objective

229 — I can use a spreadsheet to work out sums

Evidence of working within Level 3  229 — I can change data in spreadsheets to answer questions.

229 — I can explain why I made changes to the spreadsheet

Objective

I designed a spreadsheet with calculations (2 Files attached)

Evidence of working

Sidebar:
- Karen Perneys (student)
- Journal
  - Add Post
  - Manage
  - Timeline
  - My Newsfeed
- Marksheet
  - View task
  - Send message
  - Task Timeline Top menu: Newsfeed, Journal, Assets, Classes, Inbox

Fig. 17

METHOD FOR FACILITATING ASSESSMENT OF A COURSEWORK ANSWER AND MODERATING THE ASSESSMENT

CROSS REFERENCE TO RELATED APPLICATION(S)

This application is §371 U.S. National Phase of International Application Serial No.: PCT/GB2009/050974 filed Aug. 4, 2009, which is turn claims priority to British Applications Serial Nos: 0814707.6 filed Aug. 12, 2008 and 0904097.3 filed Mar. 10, 2009. The entire disclosure of all the above documents is herein incorporated by reference.

BACKGROUND

1. Field of the Invention

The present invention relates to a method for facilitating assessment of a coursework answer and moderating the assessment.

2. Description of the Related Art

Assessment of a coursework answer, such as homework or end of unit assessment work, has traditionally been carried out on paper. A coursework question would be given to the student. A coursework answer would be submitted by the student on paper. An assessor would assess the work and express this assessment by writing on the work in ink, traditionally red ink, indicating marks awarded and providing comments relating to how well the student has met the objectives of the coursework. Where a mark is awarded the assessor will ordinarily indicate this with a tick or a number associated with the number of marks warranted. The number of ticks or marks will be summed to give an overall mark for the coursework answer. The overall mark can then be compared to a chart to give an overall grade or compared to the other students' overall marks to give an overall grade.

A problem associated with this traditional method is that the coursework is inherently modified by the assessment, in that the coursework will have red ink written over much of the coursework; and errors are commonly made in the addition of the ticks or numbers in marking.

The coursework may be assessed by more than one assessor. This is particularly important for coursework which leads to a nationally recognised qualification, where the marking has to be provably unbiased, accurate and fully representative of the students' coursework answer. In this case, the coursework answer is photocopied to produce a copy and the further assessor has the copy of the coursework answer which is assessed independently. The overall mark awarded by the assessor is compared to the mark awarded by the further assessor. Inter alia, if there is a large variation between these marks, the coursework with the assessments of the assessor and further assessor are sent to a moderator. The moderator will review the marks awarded by each of the assessors to moderate the assessments to provide a moderated mark. The moderator may also review a coursework answer which has been marked consistently by the assessor and further assessor(s) to check on the quality of the assessor and further assessor's assessments.

A problem with this traditional method of assessment is that photocopying coursework is time consuming, expensive and does not necessarily fully reflect the original coursework answer, particularly, but not exclusively, if the coursework involves multimedia digital video, photo and sound files.

Another problem with this traditional method of moderating the assessment is that it is difficult and time consuming, in that: errors are commonly made in the addition of the ticks or numbers; and it is often difficult to find evidence for the mark awarded.

A further problem is sharing the assessment for student review. The assessor may not be able to express his assessment clearly due to the lack of space on the coursework or due to fear of obscuring part of the original work. Thus the student may not fully appreciate the reason for the assessor's mark.

A further problem is sharing the assessment for student to student review (peer to peer review).

SUMMARY

In the field of hand written examination paper answers, examination paper answer sheets submitted by candidates can be scanned and the scanned file can be used in a computer program package to facilitate assessment. For example, multiple choice answer papers can be marked by the computer program with very little or no assessor intervention.

Examination paper answer sheets which comprise candidates' textual and pictorial answers are generally not capable of being assessed by computer. However, these examination paper answer sheets may be scanned and sent electronically to the assessors. This has the advantage of reducing the amount of copying and posting of examination paper answer sheets to the assessors and, coupled with workflow management software, facilitates the assessors' workflow. It will be appreciated that examination paper answer sheets are all submitted in the same format, unlike coursework.

A student may answer a coursework question using a computer application program, such as Word™, Powerpoint™, Inspiration™ or Flowol™. The coursework answer may be saved in a data file for that application and submitted to the assessor (i.e. handed in) in that form. Alternatively, a coursework answer may be printed and submitted on paper of various sizes. But in so doing, some of the benefit of using a computer to generate this coursework will be lost. A Powerpoint™ presentation, when printed out, loses all animation, sound, video and transitions that have been included. When a spreadsheet is printed, for example, it is impossible to see what, if any, formula have been used to calculate specific cells. A coursework answer may utilise any sort of recordable medium to record the coursework, such as on paper, or in computer readable text files, drawing files, spreadsheet files, database files, video files, audio files etc. recorded on to a flash memory stick, a network drive, a local drive, a CD or DVD or the like. In the case of design and technology, art and some other coursework, the coursework answer may be submitted in three-dimensional form.

In accordance with the present invention, there is provided a method for facilitating assessment of a coursework answer, the method comprising the steps of displaying at least part of a representation of a coursework answer on a display, displaying a list of learning outcome statements, selecting a learning outcome statement from the list of learning outcome statements and placing the learning outcome statement on the representation of the coursework answer at a location evidencing fulfillment of the learning outcome statement. The learning outcome statement indicates that the assessor believes this part of the coursework answer evidences meeting the learning outcome, which may be regarded as an objective of the coursework question. Advantageously, the step of selecting a learning outcome statement from the list of learning outcome statements and placing the learning outcome statement on the representation of the coursework answer at a location evidencing fulfillment of the learning outcome statement, comprises dragging a learning outcome statement from the list of learning outcome statements and dropping the learning outcome statement on the representation of the coursework answer at a location evidencing fulfillment of the learning outcome statement. Preferably, the method is carried out by an assessor. The invention is also applicable to written examination papers.

Preferably, the learning outcome statement on the representation of the coursework answer is placed in a layer over the representation, the layer switchable to view the learning outcome statement and to hide the layer such that the representation is viewable without viewing the outcome statement. Advantageously, a symbol appears at the location evidencing fulfillment of the learning outcome. Preferably, a click on the symbol will open a textbox displaying the learning outcome statement.

Preferably, the method further comprising the step of selecting a learning outcome statement from the list of learning outcome statements, which locates the learning outcome statement on the representation of the coursework answer evidencing fulfillment of the leaning outcome statement and displays the part of the coursework answer which evidences fulfillment of the learning outcome.

Advantageously, an assessor icon is displayed the method further comprising the step of activating the assessor icon to reveal a list of assessors. Preferably, each assessor listed in the list of assessors has a colour associated therewith, the outcome statement placed on the representation of the coursework answer appearing in the colour.

Preferably, a note icon is displayed, the method further comprising the step of activating or dragging and dropping the note icon on to a specific point on the representation of the coursework answer and leaving a note. Advantageously, the note is wrapped into a box, the box openable when activated.

Preferably, a comment icon is displayed, the method further comprising the step of activating or dragging and dropping the comment icon on to a specific point on the representation of the coursework answer and leaving a comment. Advantageously, the comment is wrapped into a box, the box openable when activated.

Preferably, a highlighter icon is displayed, the method further comprising the step of activating the highlighter icon on highlighting a specific area on the representation of the coursework answer.

Advantageously, the coursework answer is created in an application, the method further comprising the step of converting the coursework into a common electronic format to create a coursework file to allow the coursework answer to be read using a common reader to display the representation of the coursework answer. Alternatively or additionally, the coursework answer may be created on paper to create a paper answer, the method comprising the step of scanning the paper file into a computer. The step of creating the coursework answer may include printing the coursework answer from a computer or hand writing the answer. Preferably, scanning into a Flash readable format (.swf format) or converting a scanned file into a Flash readable file. A flash readable file generally has the file extension ".SWF". Preferably or alternatively, the common electronic format is a Flash readable file. Advantageously, the common electronic format is at least one of: TIFF; JPEG; Bitmap; and Adobe.

Preferably, the method further comprises the step of activating the coursework file to display the representation of the coursework answer and displaying a window requesting acceptance of the representation for submission, although most preferably, the coursework answer is converted to an ".swf" file, using a good converter or filter which does not alter the student's coursework answer, and thus the step of displaying the representation of the coursework answer and displaying a window requesting acceptance of the representation for submission, is not necessary. Advantageously, the method further comprises the step of submitting the coursework answer to the assessor over the internet.

There are many qualifications, such as Baccalaureate and other qualification and curriculum instances, where there is a general requirement to include a project based question which is to be answered in a diary format over a course of a few months. Due to the length, complexity and the different approaches in carrying out the project, it is difficult for an assessor or student to find the evidence to back-up the teacher's assessment of the diary answer when moderating or reviewing the teacher's assessment.

Preferably, the coursework answer is the form of a diary comprising at least two selections of diary entries, the at least two selections of diary entries having been assessed independently of each other.

The present invention also provides a method for facilitating moderating an assessment, the method comprising the steps of displaying at least part of a representation of a coursework answer on a display, displaying a list of learning outcome statements, selecting a learning outcome statement from the list of learning outcome statements, which finds the learning outcome statement on the coursework answer evidencing fulfillment of the leaning outcome statement and displays the part of the coursework answer which evidences fulfillment of the learning outcome statement.

The coursework answer may be in the form of a diary having diary entries, the method further comprising the steps of the student submitting all or a selection of diary entries for assessment, the teacher assessing the diary or selection of diary entries. The step of submitting a selection may take place at several points in time, such that the assessment of the entire diary will be made in two or more part assessments. Moderation of the assessment of the complete diary can be made in one step by clicking on the objective to be navigated to the evidence.

Preferably, the coursework answer is the form of a diary comprising at least two selections of diary entries, the at least two selections of diary entries having been assessed independently of each other. Independently of each other in terms of being assessed at different times by the same teacher, or being assessed by different teachers. The selection of diary entries may be one or more diary entries.

The present invention also provides a method for facilitating assessment of a coursework answer, the method comprising the step of converting the coursework into a common electronic format to create a coursework file to allow the coursework answer to be read using a common reader. This ensures that the integrity of the original file (which may include multimedia work comprising narrative essays, multimedia video, photo and sound files, drawing, databases and spreadsheets) will be maintained.

The present invention also provides a method for facilitating assessment of a coursework answer, the method comprising the step of displaying a representation of the coursework answer on a display and creating at least one layer over the representation, the at least one layer for having a learning outcome statement, mark or comment thereon.

A coursework question may be set using the assessment tool. Two of the resources are shown, each resource has its own icon; displaying a first and second resources for use by the student in answering the coursework question; displaying a list of objectives to be met by the student in producing a coursework answer; displaying a marking schedule for an assessor to use in assessing how well the coursework answer meets the objectives; first and second steps in operation of a workflow tool used to store and display information about the progress of preparation of the coursework answer; and displaying assessment outcomes for the coursework answer, as decided by the student and the assessor.

The present invention also provides a method for facilitating assessment of coursework, the method comprising the step of converting the coursework into a common electronic format to create a coursework file to allow the coursework answer to be read using a common reader. Preferably, the common electronic format is Flash readable. Advantageously, the common electronic format is at least one of: TIFF; JPEG; Bitmap; and Adobe.

Advantageously, the method further comprises the step of saving the coursework file in a databank. Preferably, the databank is accessible on the internet.

Preferably, the method further comprises the step of loading the coursework file into an assessment tool to enable an assessor to view the coursework file. Advantageously, the method comprises the step of creating a layer over the common electronic format, which layer allows assessment annotations to be applied thereto.

The present invention also relates to a method for facilitating assessment of coursework, the method comprising the step of displaying a representation of the coursework answer and creating at least one layer over the representation, the at least one layer for having a mark or comment thereon.

The present invention also provides an assessment tool loadable on to a computer, the assessment tool carrying out the steps of the method of the invention.

The present invention also provides an assessment tool accessible via a computer from the internet, the assessment tool carrying out the steps of the method of the invention.

The present invention also provides a method for facilitating assessment of a coursework answer, the method comprising the step of displaying the coursework answer page by page within a viewing screen, displaying a list of learning outcome statements also on that screen, providing transparent layers over the coursework answer to allow assessors to drag and drop learning outcome statements onto the coursework answer to indicate where in the coursework answer a particular learning outcome has been evidenced. Each assessor will be given his/her own individual transparent layer in which to show where learning outcomes have been met within the coursework answer as well as allowing assessors to type in comments or notes. The original coursework answer remains unaffected.

The present invention also provides a method for facilitating moderating or reviewing an assessment of a coursework answer, the coursework answer taking the form of a diary, the method comprising the steps displaying a list of learning outcome statements, selecting a learning outcome statement from the list of learning outcome statements to display a list of files containing a tag evidencing fulfillment of said learning outcome statement.

BRIEF DESCRIPTION OF THE FIGURES

For a better understanding of the present invention, reference will now be made, by way of example, to the accompanying drawings, in which:

FIG. 4 is a screenshot of a list of learning outcomes to be met by the student in producing a coursework answer to the coursework question shown in FIG. 1;

FIG. 8 is a screenshot of learning outcomes for the coursework answer, the learning outcomes assessed by the student and by the assessor;

FIG. 17 is a screenshot navigated to from activating the checklist button shown in FIG. 16, the screenshot showing a list of objectives;

DESCRIPTION OF PREFERRED EMBODIMENT(S)

Figure 1:
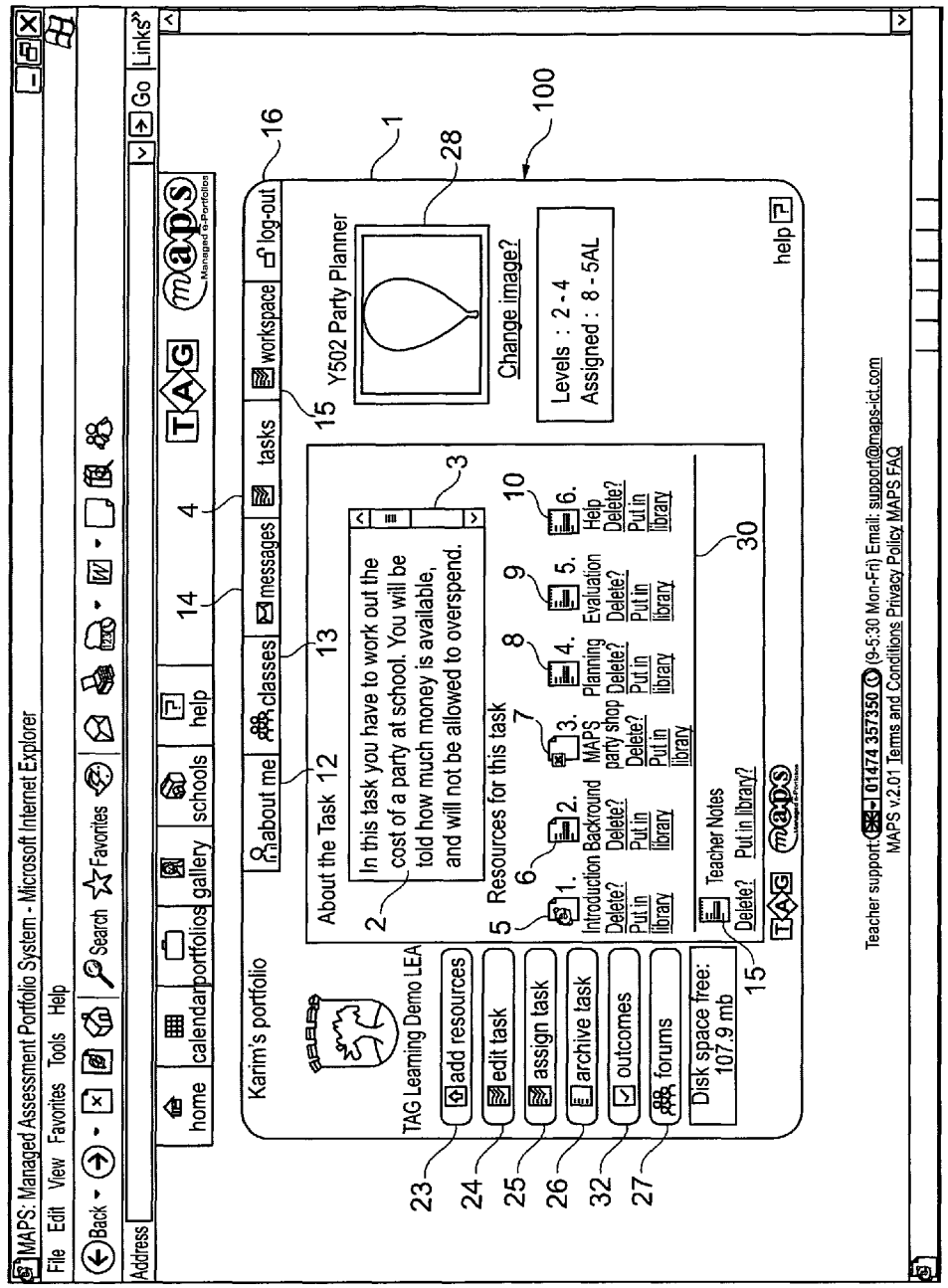
FIG. 1 is a screenshot from an assessment tool displaying a coursework question as viewed by a teacher in a method in accordance with the present invention.
Figure 2:
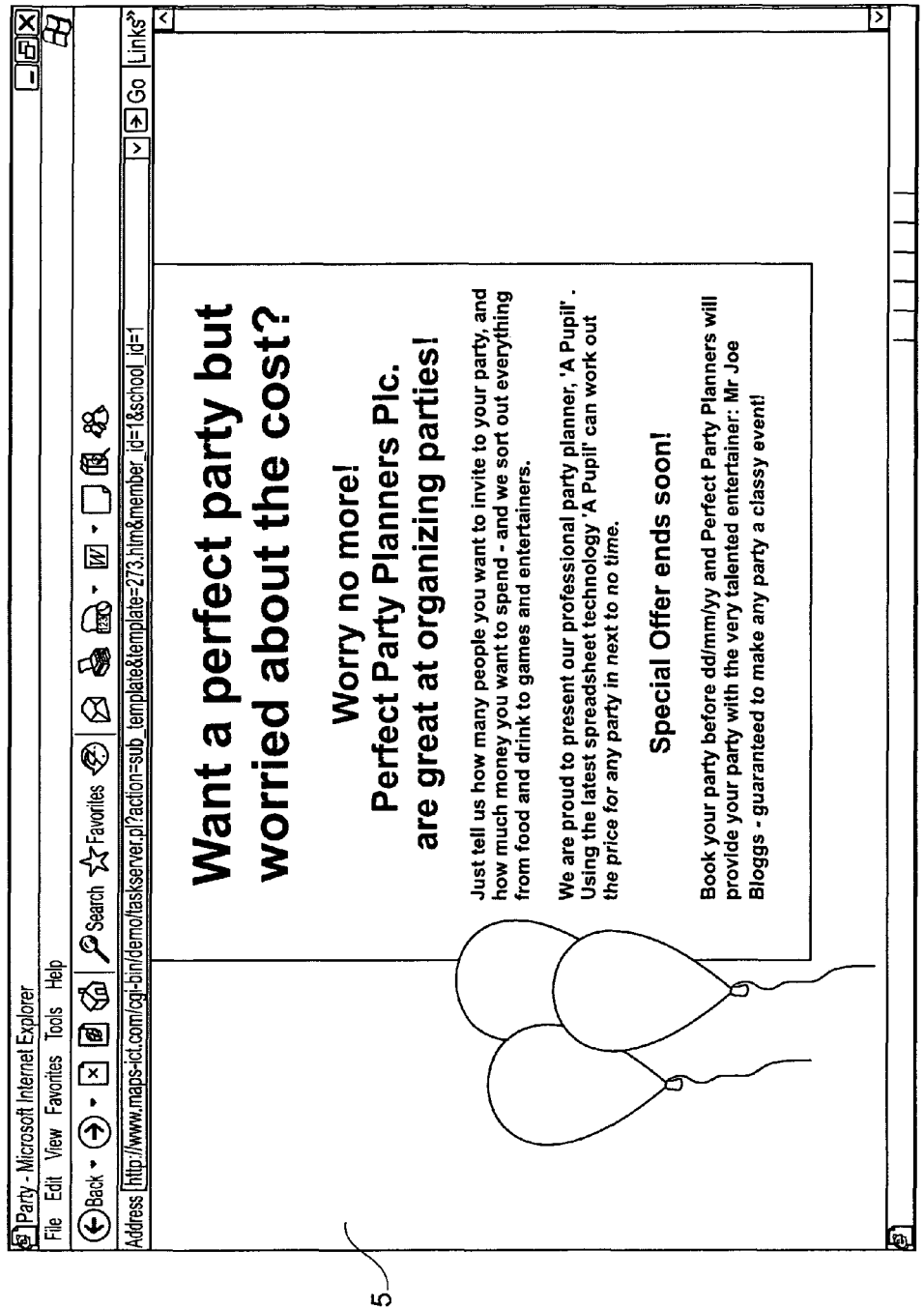
FIG. 2 is a screenshot of a first resource for use by the student in answering the coursework question shown in FIG. 1.
Figure 3:
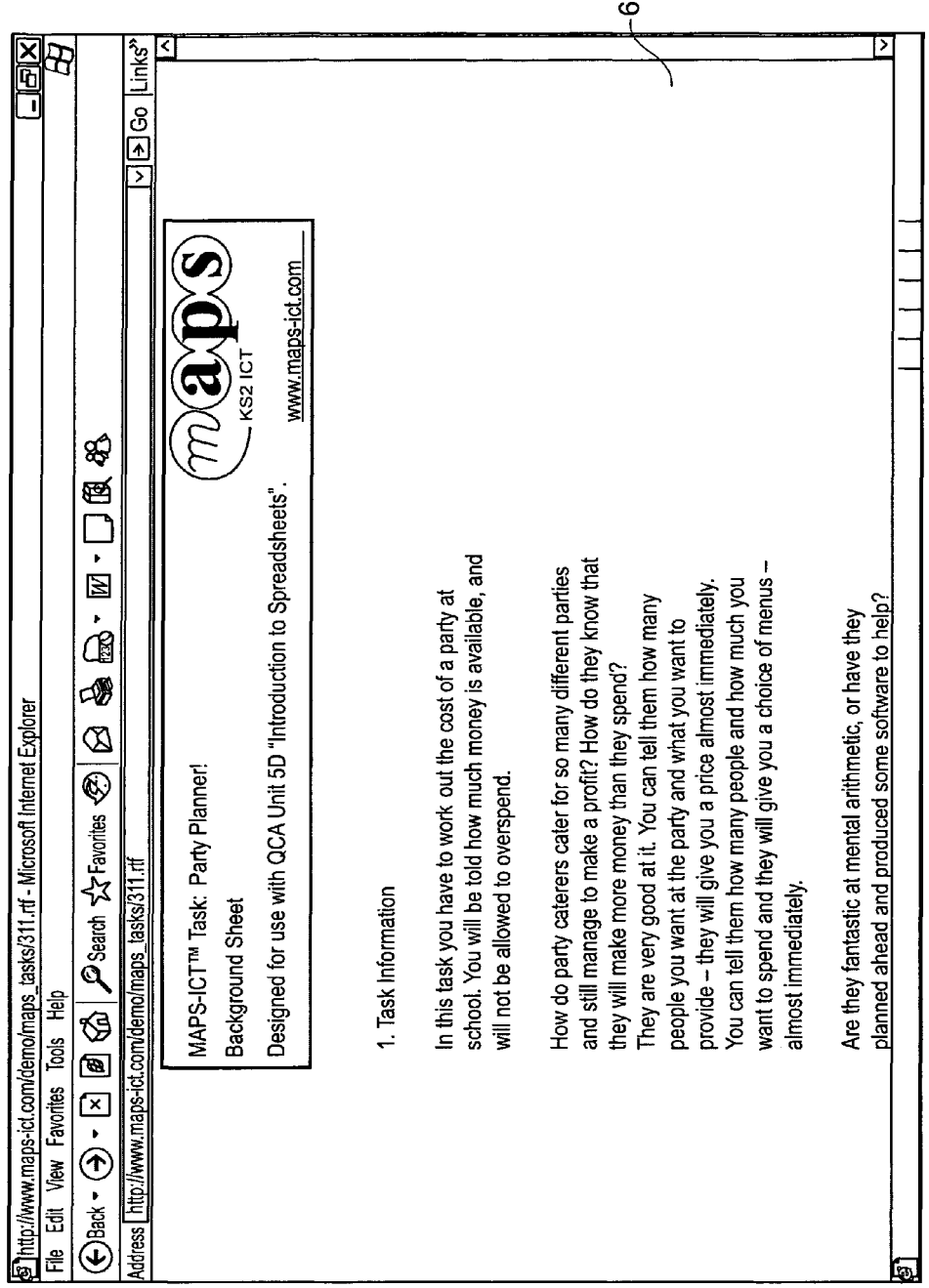
FIG. 3 is a screenshot of a second resource for use by the student in answering the coursework question shown in FIG. 1.

FIG. 1 shows a screenshot of an assessment tool, generally identified by reference numeral 100. The screenshot shows a view as seen by a teacher logged in to the assessment tool 100. The assessment tool 100 comprises a teacher's portfolio 1, in this case "Karim's portfolio". The assessment tool 100 displays a coursework question 2 to be assigned to a student, group of students or an entire class of students. The coursework question 2 is displayed in a window 3 entitled "About the Task". The coursework question 2 is displayed under a "tasks" tab 4. The coursework question 2 in this case relates to party planning, and includes: working out how much a party at school will cost; creating a theme for the party; what will be provided at the party etc. This is a Unit 5D, QCA Scheme of Work for Year 5 primary aged pupils. Six resources 5-10 are provided to facilitate the student answering the coursework question 2. A first resource 5 is shown in FIG. 2 and a second resource 6 is shown in FIG. 3. The first resource 5 is a link to a web page introducing Perfect Party Planners Plc and sets out some information for the student. The second resource 6 is a text file setting out more detailed information about the coursework question 2, including information about caterers, which are a fundamental part of party planning. The second resource 6 also provides a complete overview of what needs to be done for the particular coursework question, and sets overall objectives for the student.

Resource 7 is a spreadsheet file. Resources 8 to 10 are further text files.

Figure 11:
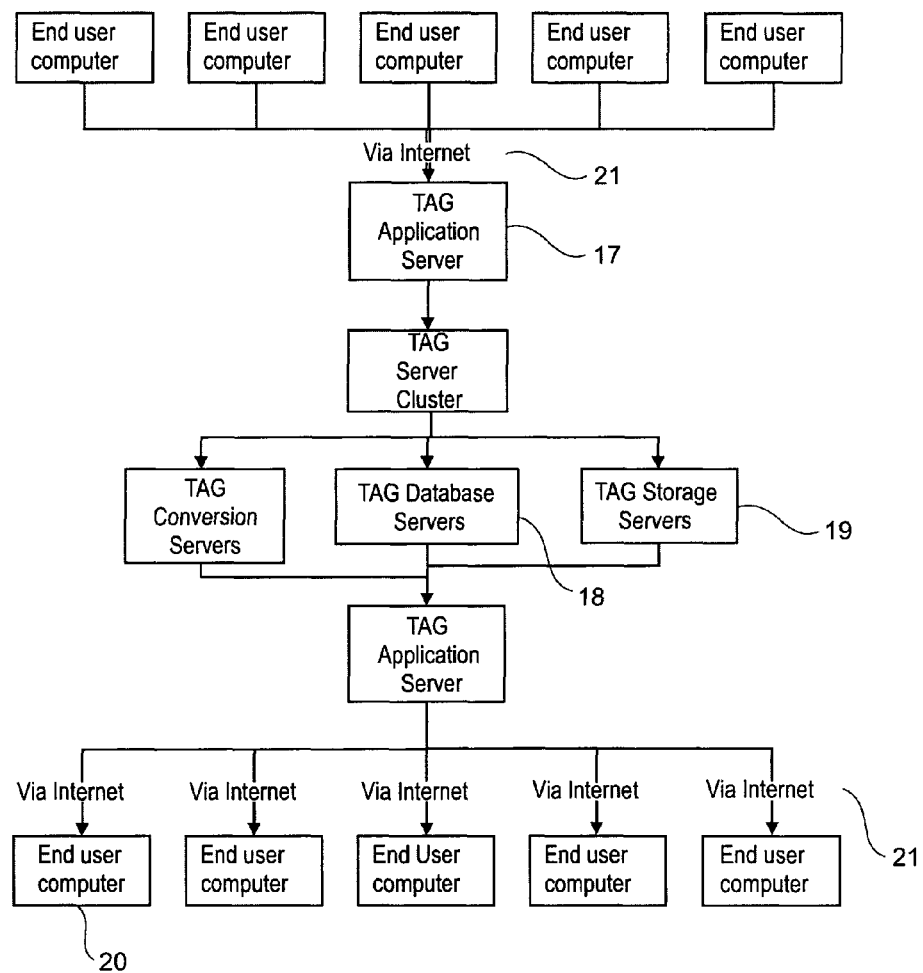
FIG. 11 is a block diagram showing the arrangement of computers in a system in accordance with the present invention.

The coursework question 2 can be set by the teacher directly using a task creation tool (not shown) and then displayed in the window 3 or selected from a number of coursework questions held in a task bank in the storage bank 19, FIG. 11, the selected coursework question 2 displayed in the window 3. Each of the number of coursework questions held in the storage bank 19 includes an associated marking schedule, see FIG. 5 and list of learning outcome statements 33, see FIG. 4. The marking schedule may reflect the learning outcome statements and provide marks beside each outcome statement 83. There may be additional statements in the marking schedule, such as statements generic to all coursework questions in that subject, such as spelling, grammar, etc.

A teaching resource 11 is also provided. The teaching resource 11 is a document setting out information for the teacher setting, supervising or assessing the coursework question 2.

Other tabs are provided within the teacher's portfolio 1, which are: an "about me" tab 12, for storing and displaying the teacher's personal details such as full name, home address; a "classes" tab 13 lists the teacher's classes, and a scrollable list of students in each class and timetable; a "messages" tab 14 provides a messaging service with students about the task and other teachers; a "workspace" tab 15 for facilitating creation of a coursework question; and a "log out" tab 16 for logging out of the teacher's portfolio 1.

The teacher's portfolio 1 is run within the assessment tool 100. The assessment tool 100 is run on an application server 17, and uses a database server 18 and a storage server 19 as shown in FIG. 11. The application server 17 may be available to end users' computers 18 on an intranet or internet 21. The assessment tool 100 is available to subscribing end users on their computers 20 over the internet or intranet 21 through a web browser. The end users' computers 21 can be those of the student, teacher, assessor, moderator or a third party with access rights. The end users are able to access the assessment tool 100 on the application server if they have appropriate access rights, which may include entering a password, finger print recognition, iris recognition or any other suitable form of access right.

Under the "tasks" tab 4, there is an "add resources" button 23, which when depressed enables the teacher to upload a resource, such as resources 5 to 10, to "resources for this task" section to the coursework question 2. There is also an "edit task" button 24 which when depressed unlocks the coursework question 2 to allow a teacher to edit the coursework question 2. There is also an "assign task" button 25 which when depressed allows the teacher to select students to assign the coursework question 2 to a student or more than one student from a list of students 38, see FIG. 6. There is also an "archive tasks" button 26 for saving the coursework question 2 in the storage server 18, so that the coursework question can be re-used or modified at a future date. There is also an "outcomes" button 32 for accessing a list of outcome statements 33, see FIG. 4, which relate to the coursework question 2.

An "upload notes" button (not shown) allows the teacher to upload a teacher resource 11, which adds an icon to the teacher resource list 30.

A further button (not shown) allows the teacher to upload an image 28 displayed on a right hand side of the screenshot.

A learning outcomes screen 31, shown in FIG. 4, is viewable by clicking on the "outcomes" button 32. The learning outcomes screen 31 displays a list of learning outcome statements 33 defined by the teacher. The learning outcome statements 33 set out the objectives of the coursework question—2. In this case, there are three outcome levels: Outcome 1—Target Level 2; Outcome 2—Target Level 3; and Outcome 3—Target Level 4. The Target Levels are set out below. For each level to be reached, the student's answer must demonstrate each learning outcome statement 33 has been met.

Target Level 2:
  I can use a spreadsheet.
  I can fill data into a spreadsheet made by my teacher.
  I know about cells and naming them.
  I can talk about what the spreadsheet does.
Target Level 3:
  I can use a spreadsheet to work out sums.
  I can change data in spreadsheets to answer questions.
  I can explain why I made changes to the spreadsheet.
Target Level 4:
  I designed a spreadsheet with calculations.
  I can use 'SUM' to add up a set of numbers.
  I can alter the calculations in a spreadsheet.
  I can tell you what will happen if I make changes to the spreadsheet.

Figure 6:
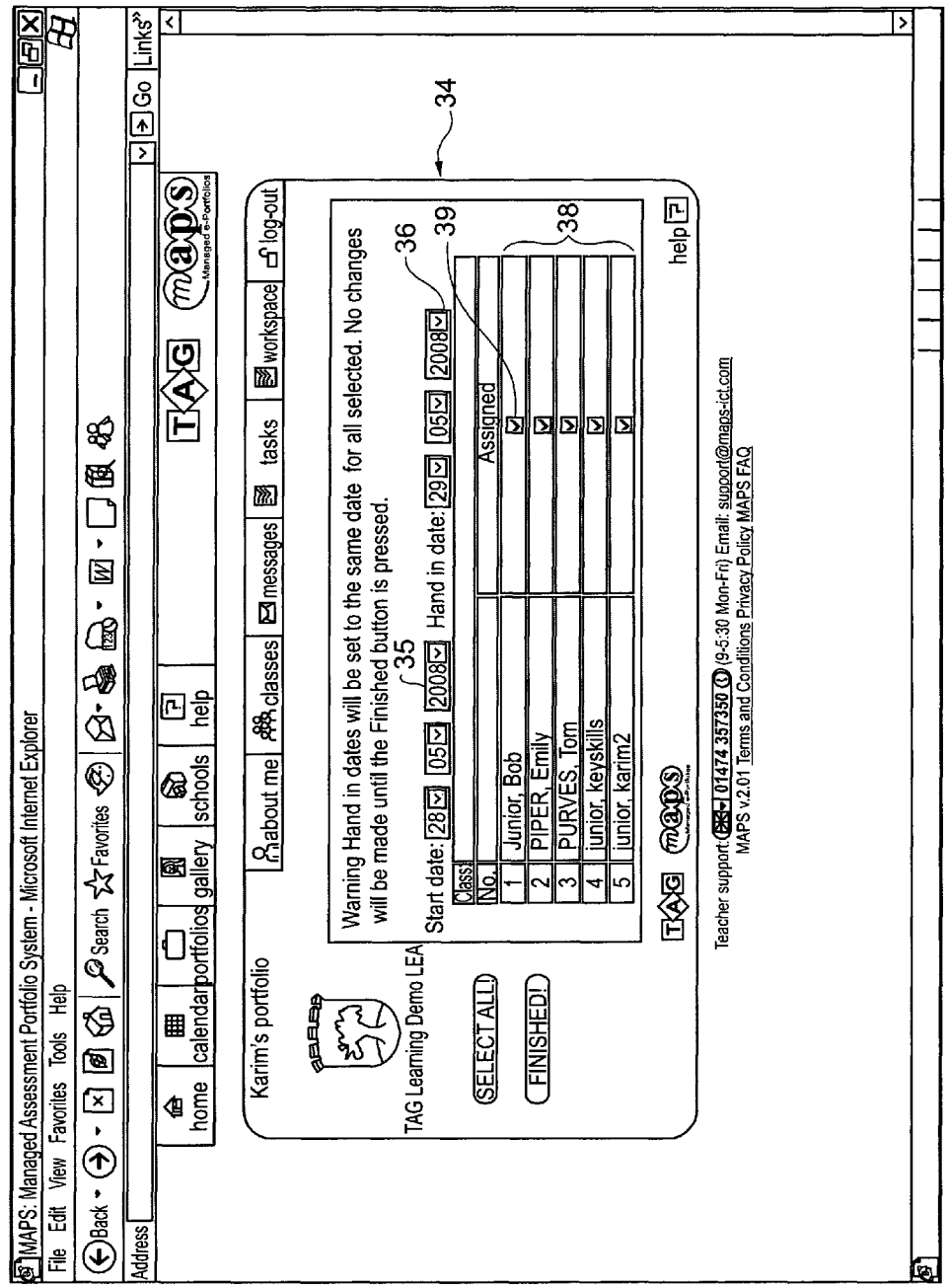
FIG. 6 is a screenshot of a first step in operation of a workflow tool used to store and display information concerning the status of the coursework answer, as seen by a teacher.

When the teacher has depressed the "assign task" button 26, window 34, as shown in FIG. 6 opens. The teacher assigns the coursework question 2 to a student or a number of students from the scrollable list of students 38 by checking a check box 39 next to each name to indicate that particular student has been assigned the coursework question 2. The teacher sets a start date 35 and a submission (hand-in) date 36. The teacher may assign the coursework question 1 to an individual student, a group of students, a whole class, or to a number of classes and includes a start date 35 and a hand-in date 36 for each individual student, group of students, whole class, or to a number of classes or any number of students of the group, whole class or number of classes.

Figure 6A:
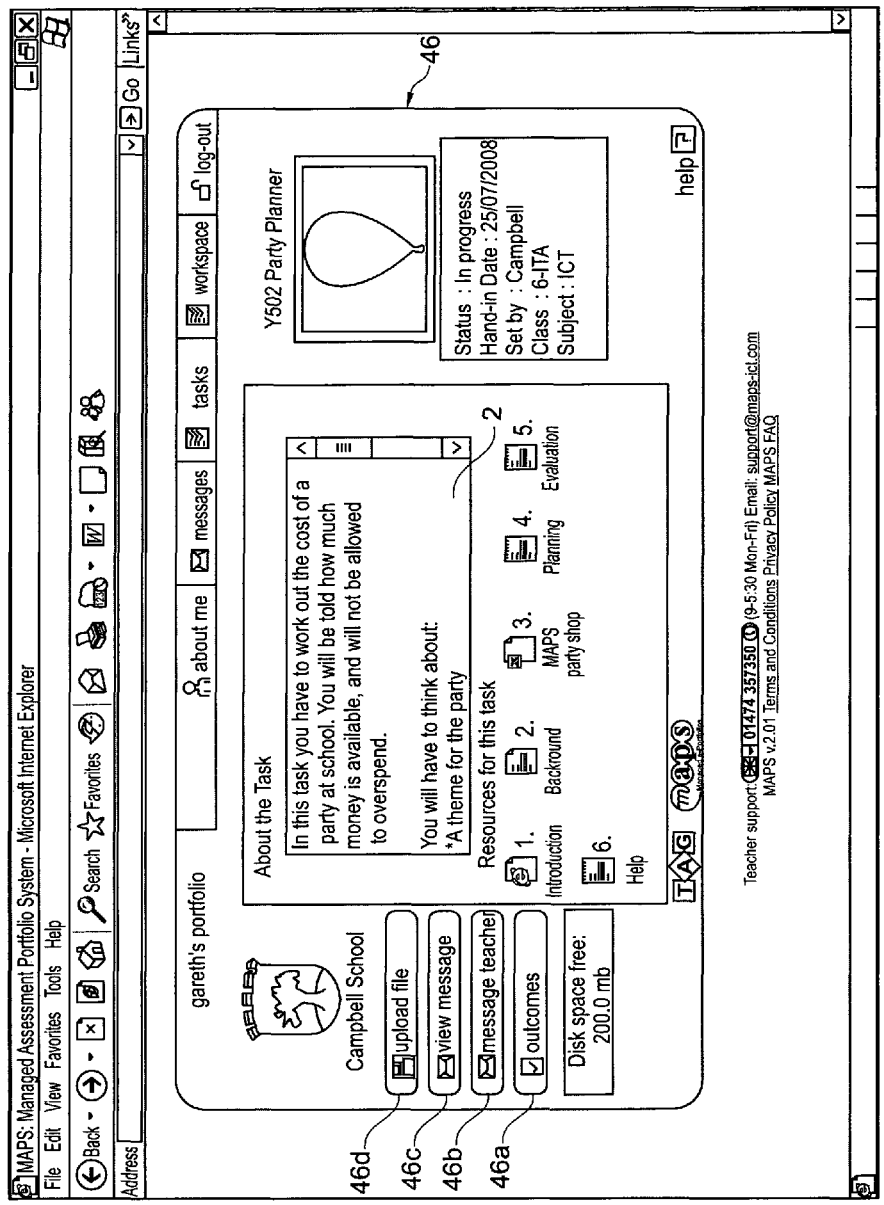
FIG. 6A is a screenshot from the assessment tool displaying a coursework question as viewed by a student.
Figure 7:
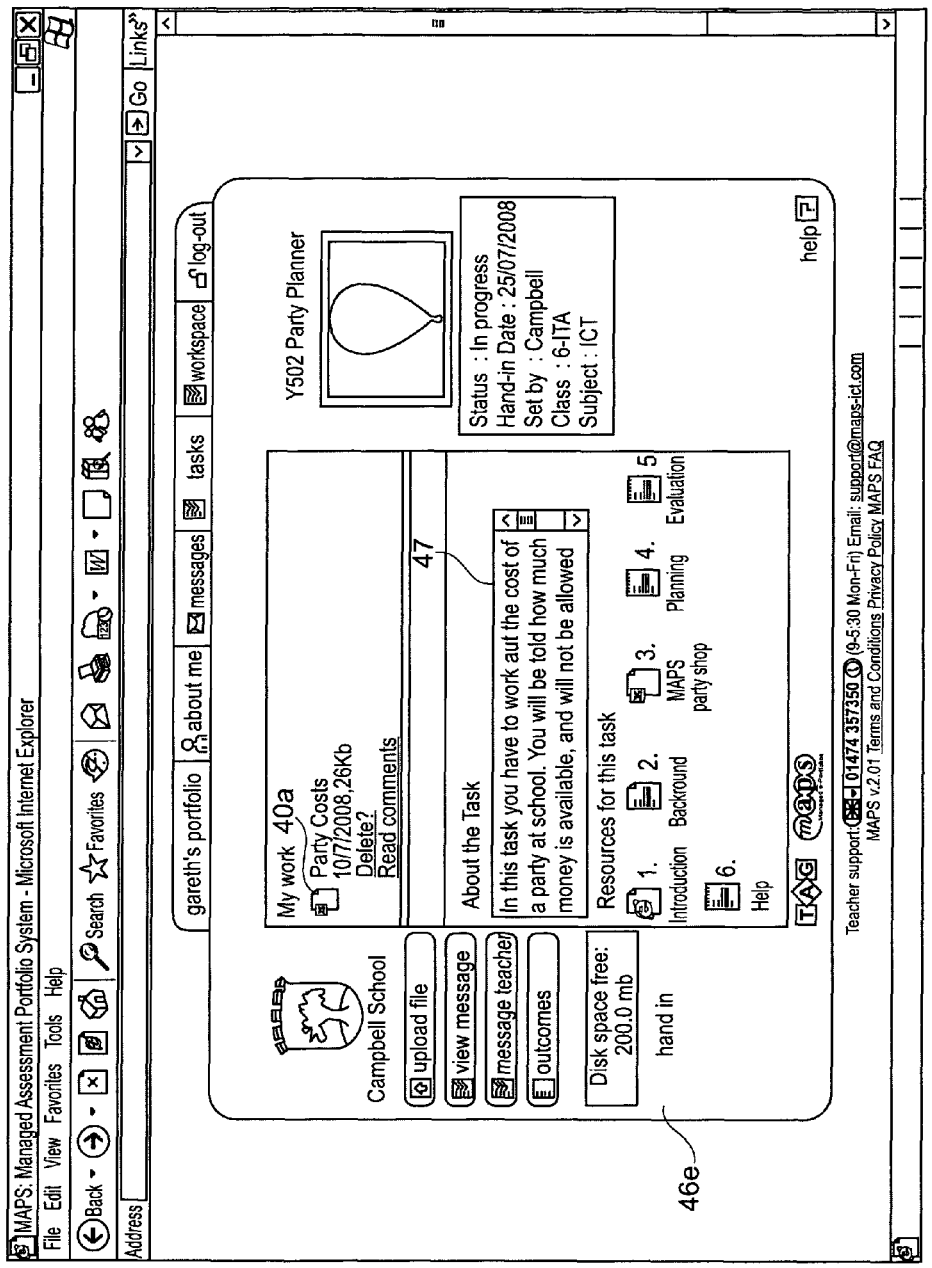
FIG. 7 is a screenshot from the assessment tool shown in FIG. 6A displaying a coursework answer to be submitted by a student.
Figure 7A:
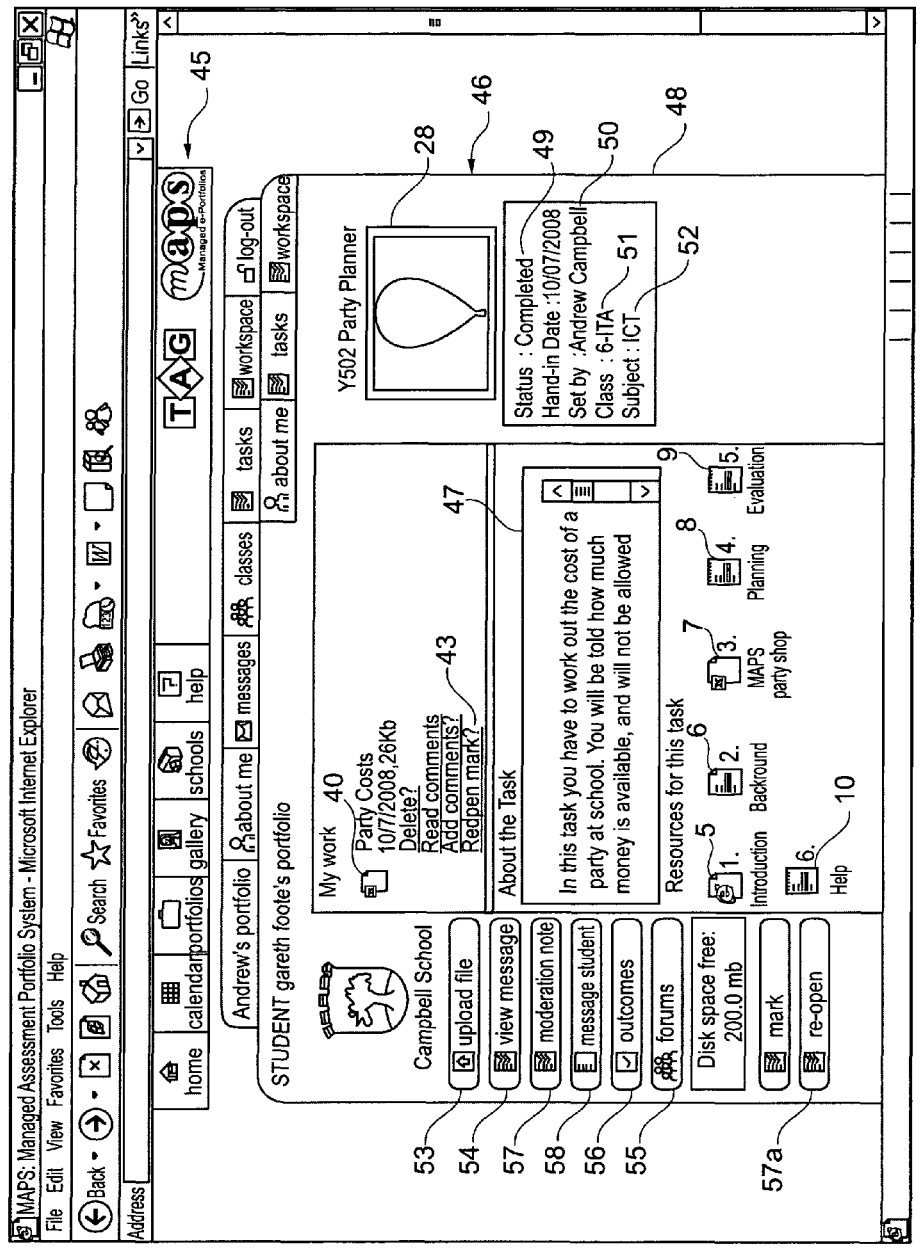
FIG. 7A is a screenshot of the assessment tool shown in FIG. 1 when logged in as an assessor.

Each student has his own portfolio 46, shown in FIGS. 6A and 7, which he logs in to. The student's portfolio 46 is generally similar to the teacher's portfolio 1, but without some of the functionality, such as the task creation tool or the buttons 23 to 26. The learning outcome statements 33 are viewable by the student. Resources 5 to 10 are visible and accessible to the student, but teacher resources 11 are not visible or accessible to the student. The student has additional functionality. The student can view the list of learning outcome statements for the coursework question by clicking on "outcomes" button 46a. The student can leave a message for the teacher using "message teacher" button 46b, view messages left for the student using "view messages" button 46c, and upload files, such a finished coursework answer or a coursework answer in progress using "upload files" button 46d.

The student's portfolio 46 is shown in FIG. 6A displaying a coursework question 2 assigned by a teacher to the student. FIG. 7 shows a file 40a containing the student's coursework answer, which may be ready for submission or incomplete. When the student is ready to submit his file 40a final coursework answer, he will click on "hand-in" button 46e.

Figure 12:
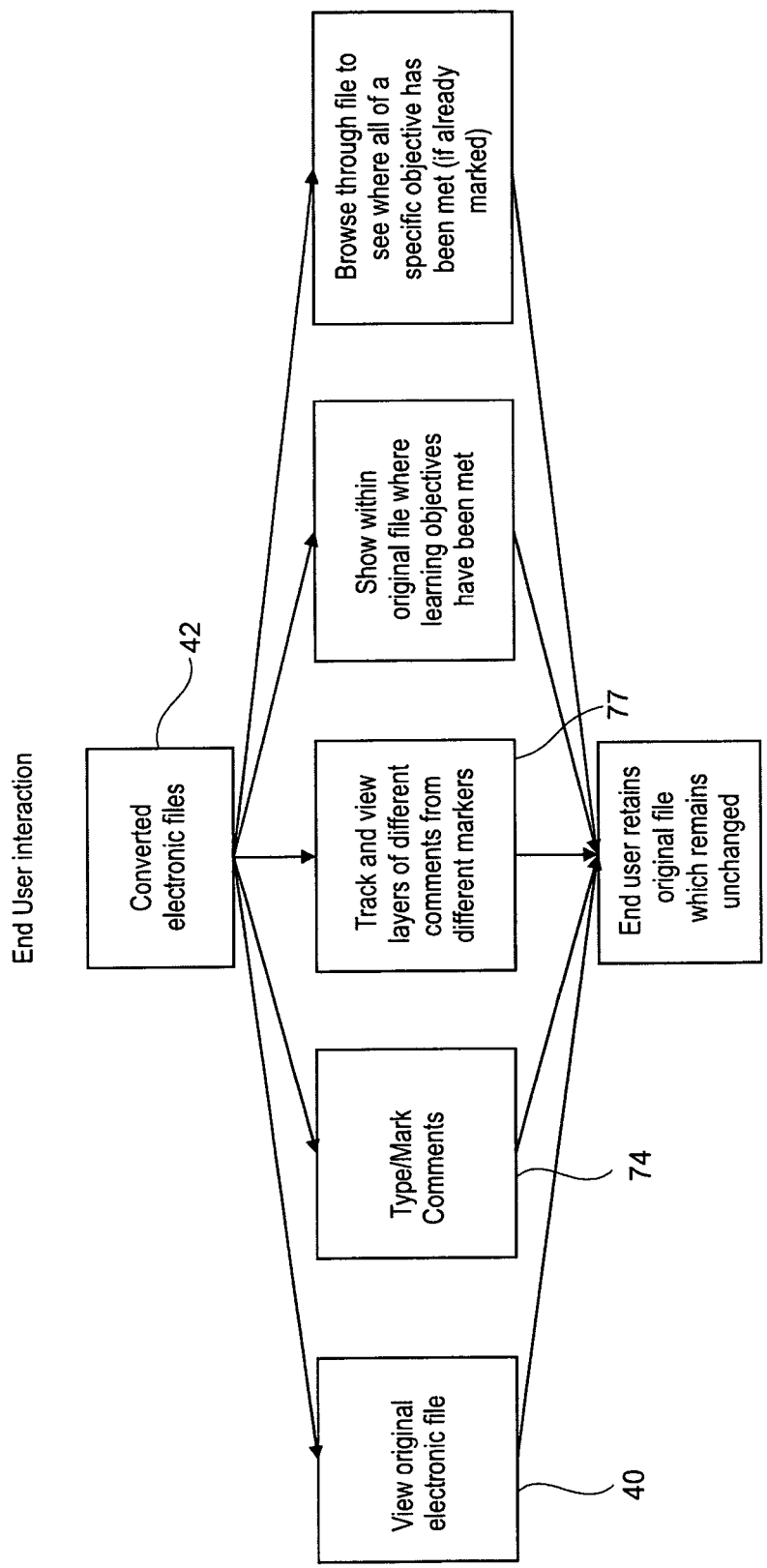
FIG. 12 is a block diagram showing the steps that can be taken by a student or assessor in a method in accordance with the present invention.
Figure 13:
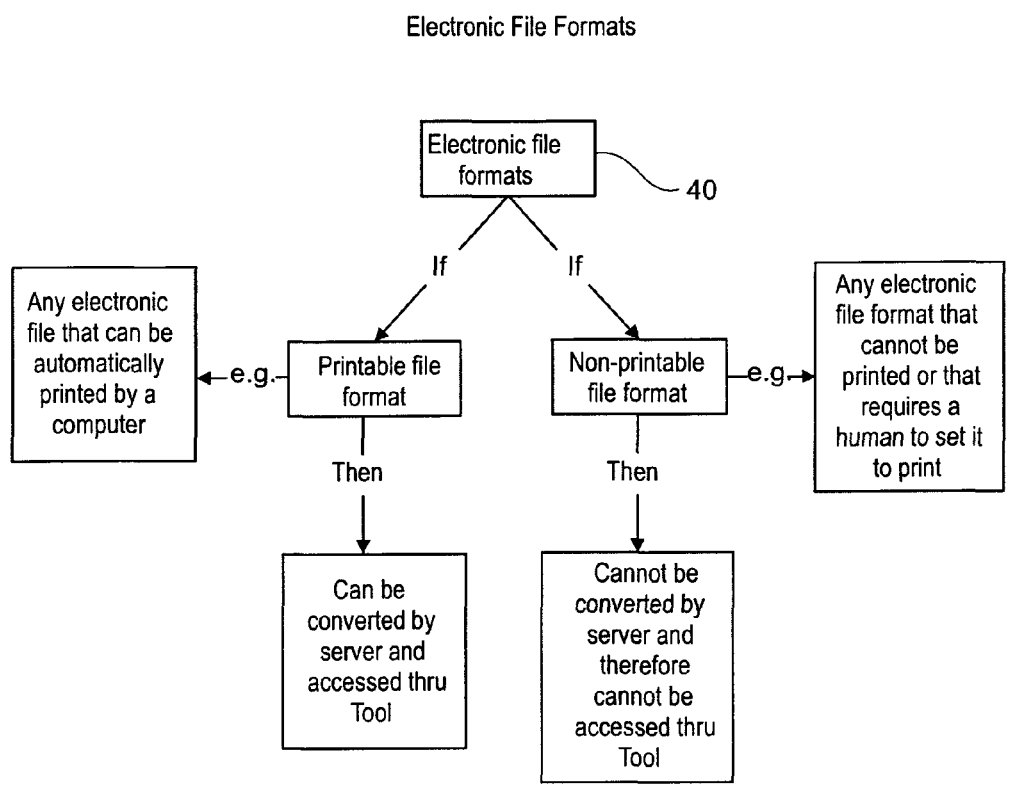
FIG. 13 is a flow diagram showing steps in coursework conversion.
Figure 14:
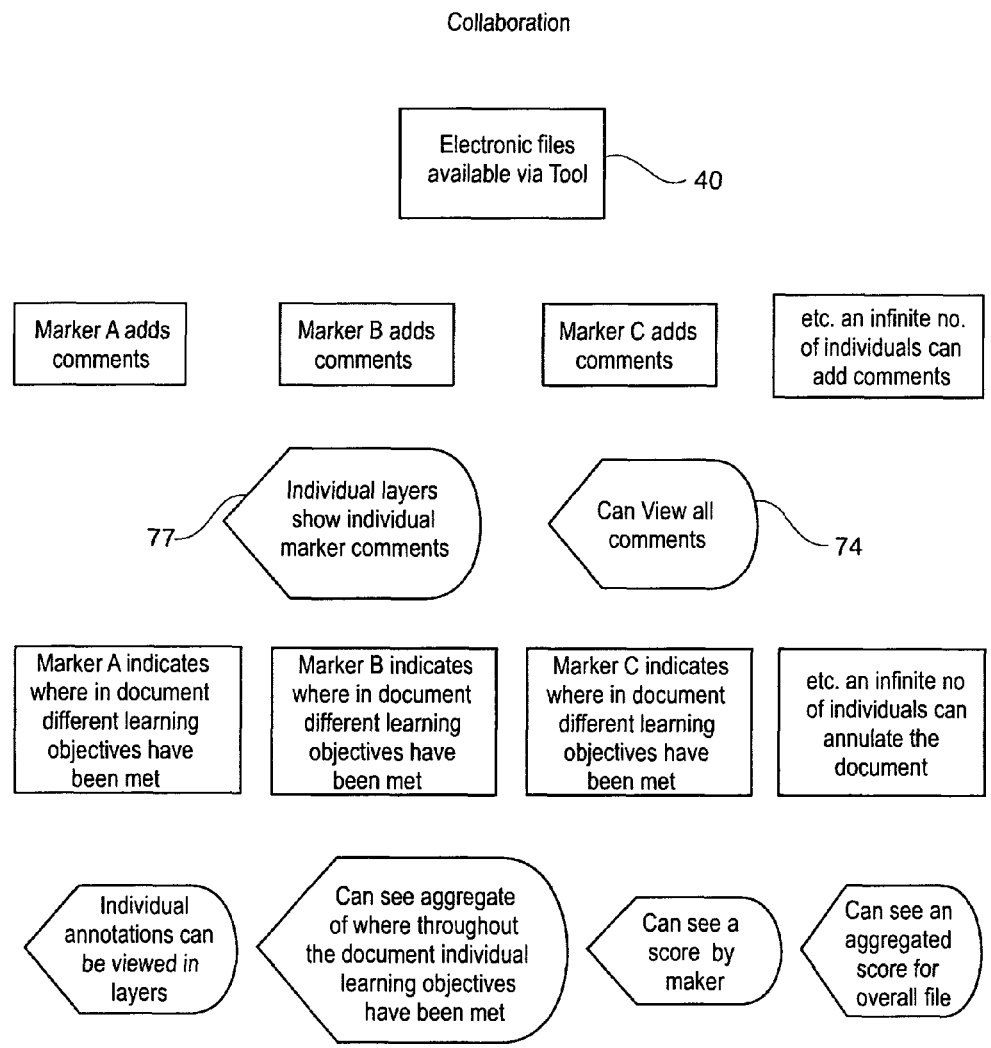
FIG. 14 is a flow diagram showing steps in a method of moderating the assessment in accordance with the present invention.

The student completes an answer to the coursework question 2 in an application, such as Word™, and saves the file 40 either locally onto his computer, or onto the network or onto a removable disk. When the student is ready to submit the coursework answer question 2, he will log in to the assessment tool 100, select the coursework question 2 for which the coursework answer relates, find the saved file 40a and select 'hand-in' 46e to submit his coursework answer. The submitted file 40 is saved directly into storage server 19 (FIG. 11) accessible through the assessment tool 100. The student also retains a copy of this file on his computer, network or removable disk drive. When the submitted file 40 is saved into the storage server 19, the submitted file 40 is scanned and virus checked before the submitted file 40 becomes available within the assessment tool 100. The assessment tool 100 also carries out a step of converting the file 40 to a common electronic format, such as using a Flash converter to place the submitted file in a Flash readable file 42, FIG. 12. The student can then view the Flash readable file 42 is then saved into the databank 41. The Flash readable file 42 may be viewed by the student in a Flash reader. The Flash readable file 42 may then be regarded as the definitive file for assessment purposes or an alternative to the format submitted by the student.

If the student completes his coursework answer on paper, the paper answer may be scanned and submitted through the assessment tool 100, which automatically carries out the step of converting the file Flash readable file using the Flash converter.

When the teacher logs into the assessment tool, he is alerted that a coursework answer has been submitted. The teacher navigates to the coursework answer in the teacher's environment 45 and clicks on the name of the student from the scrollable list of students 38 to reveal the student's portfolio 46, in this case, Gareth's portfolio as viewed within the teacher's environment 45 shown in FIG. 7. Gareth's answer is viewable by clicking on the Flash readable file link 43 shown in the "My Work" window 44. An "About the Task" window 47 displays the coursework question 2; resources 5 to 10 are shown therebelow; and teaching resource 30 is shown therebelow. A summary window 48 is provided on the right hand side of the screenshot, below image 28. The summary includes a status 49 of the answer: completed; in progress; or marked. The hand-in date 36; the name of the teacher 50 who assigned the coursework question 2; class number 51, in this case class 8-5AL; subject 52, in this case Information and Communication Technology (ICT).

From this screen in the teacher's environment 45, teachers have access to their student's portfolio. The teacher can send that student additional resources if necessary using an "upload file" button 53. The teacher can view the history of messages between themselves and that student about that particular coursework question 2 using "view message" button 54. The teacher can view any participation that student has had within a discussion forum for that particular task by pressing button 55. The teacher can view the list of learning outcomes 33 by pressing button 56. This student's portfolio 46 can be included in a moderator's portfolio (not shown) or adding a note for a moderator by clicking on the "moderation note" button 57. The teacher can also send the coursework answer 40 back to the student for further work by clicking on the "re-open" button 57a and/or send him a message using the "message student" button 58.

When the teacher is ready to assess Gareth's answer, the teacher clicks on the Flash readable file link 43 entitled "Red Pen Mark?", which opens the Flash readable file 42 as the student's answer 59 in a window 60 of a tool referred to by the applicant as "Red Pen Tool™" 61. Typically, the Flash readable file 42 will comprise a number of standard size pages of text, charts, graphs and images. The standard size page may typically be A4 or A3. The Flash readable file 42 is typically displayed a page at a time or part of a page of the student's answer 59. The student's answer 59 can be paged through using arrow keys 62 and zoom in and out using magnifying glass icons 63. A list 64 of outcome statements 33 appears beneath window 60. The outcome statements 33 reflect the learning outcome statements 33 listed in FIGS. 4 and 8. When marking the coursework answer 59 each of these learning outcome statements 33 can be dragged and dropped on the student's answer 59 onto the precise incidents within the coursework answer 59 where the student has met that learning outcome 33. A placeholder 65 appears where each learning outcome statement 33 has been dropped.

The teacher can immediately begin marking, commenting on or annotating the work and a layer for that specific teacher is automatically created. For this particular task, only one teacher/assessor has marked the work, and that is Andrew Campbell whose marks, notes and comments are shown in blue. If more teachers or assessors had marked this piece of student coursework, then those "layers" icon 66 on a top tool bar 67, which reveals a pull down list of assessors 68. Each assessor 69 has an associated colour. The teacher selects his name, in this case Andrew Campbell, blue. The teacher reads the student's answer and selects an appropriate outcome statement 33 from list 64 where a learning outcome statement has been met, and drags and drops the appropriate outcome statement 33 on to the evidence in the student's work to identify the evidence on to transparent or invisible layer 77 over the coursework answer 59. The transparent layer 77 is unique to Andrew Campbell. The placeholder 65 will be coloured blue. The list 64 remains a complete list of all outcome statements. The list does not deplete with each use of an outcome statement. Once used, the outcome statement 33 may change colour, indicating to the teacher or moderator, that the student's answer 59 incorporates matter which satisfies that particular outcome statement 33.

The teacher can also drag and drop a note box 70 from note icon 72 on to specific points on the student's answer 59, which are identified by a thumbtack 71. The note box 70 is sizeable to allow text to be wrapped therein, and reveals itself when the cursor (not shown) is moved over the thumbtack 71. Any number of note boxes 70 can be added to the student's answer 59. The note boxes 70 can contain a significant amount of text.

The teacher is also able to grade the answer or part of the answer based upon the mark scheme established for that particular coursework question. If the task is created by the teacher, then the teacher may pick from a number of marking schedules, including a simple Pass/Fail, 1-100, Grades A-G, and H-V. If the task relates to a general or vocational qualification, the mark scheme will be dictated by the examination awarding authority.

Figure 5:
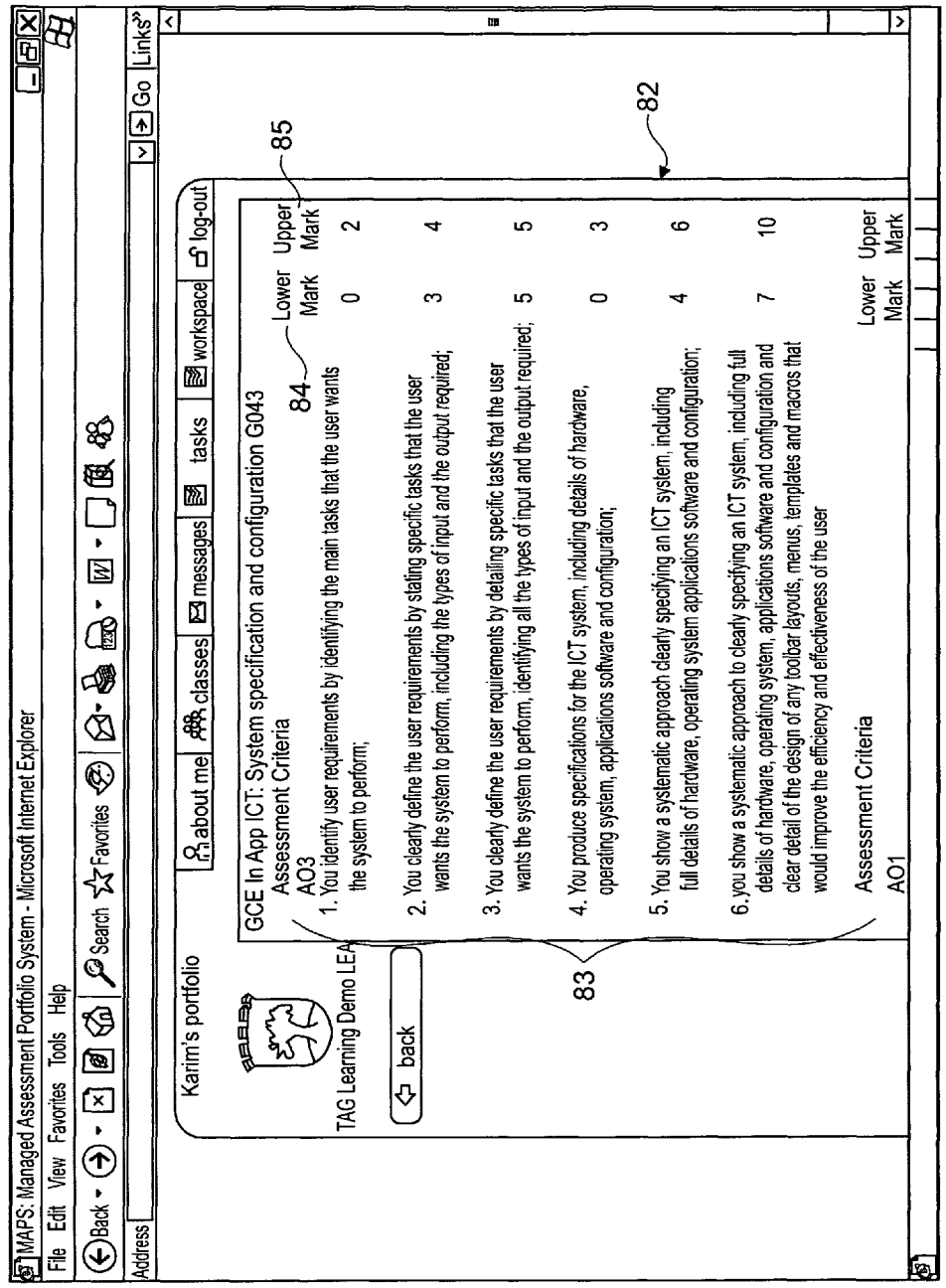
FIG. 5 is a screenshot of a marking schedule for an assessor to use in assessing how well the coursework answer meets the learning outcomes listed in FIG. 4.

Grade 73 are dragged and dropped on to a specific point on the coursework answer 59. Any number of grades 73 can be added to the student's answer 59. The assessor uses a marking schedule 82. The marking schedule 82 may comprises a list of assessment criteria 83 and associated list of lower marks 84 and list of higher marks 85 (the example in FIG. 5 is from a GCE qualification).

The teacher is also able to add a comment by dragging and dropping a comment icon 74. The comment icon 74 allows text to be added to the answer. Any number of comments can be added to the student's answer 59. The comment icon allows a small amount of text to be placed on the transparent layer 77 on the coursework answer 59, and is permanently visible when the layer 77 is selected.

Figure 9:
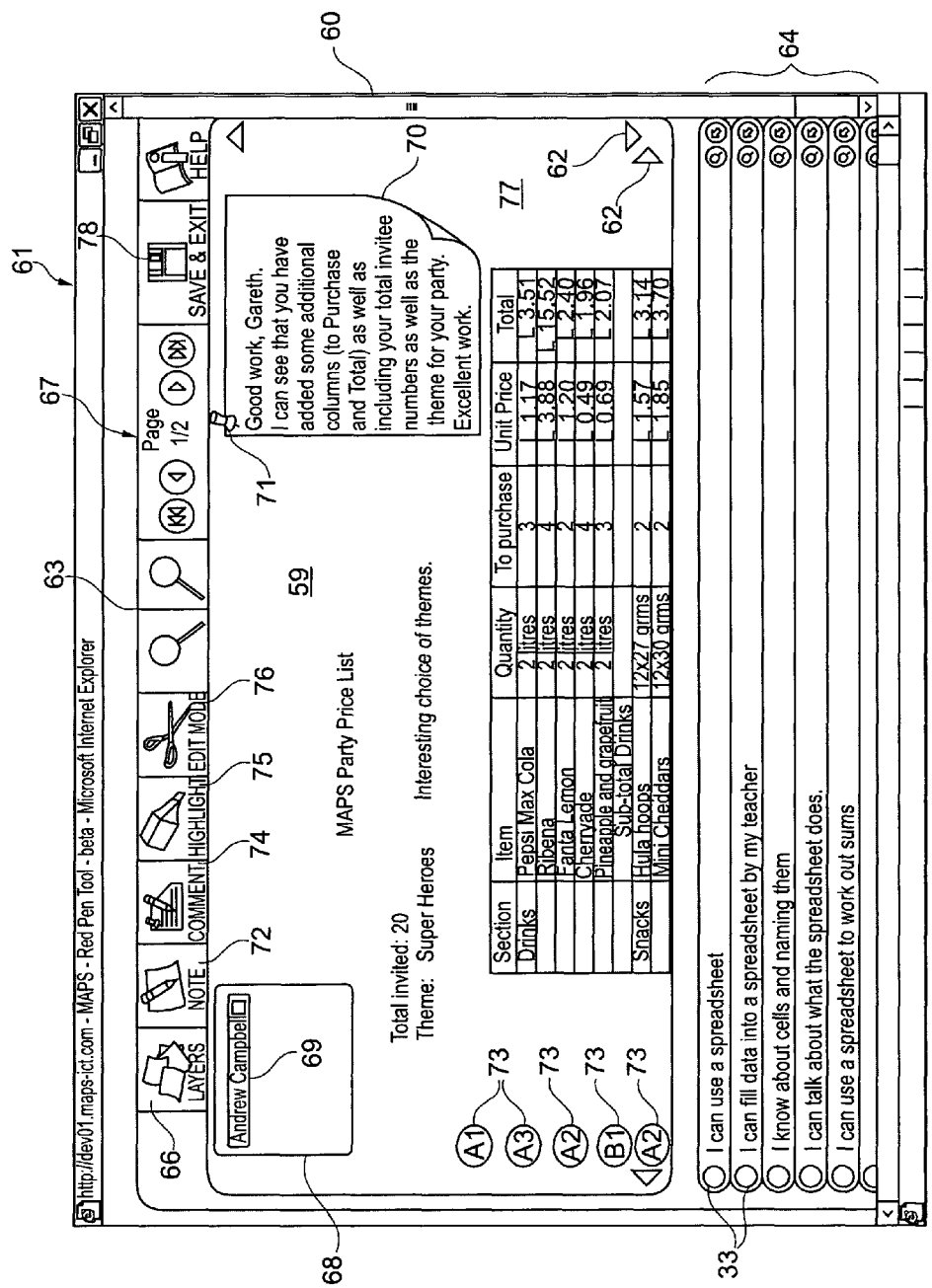
FIG. 9 is a screenshot of a coursework answer being assessed, in accordance with the present invention.

The teacher is also able to highlight words or any part of the student's answer 59 by dragging and dropping a highlighter icon 75. Any number of highlighted areas (see the Theme of Super Heroes which is highlighted on FIG. 9) can be added to the student's answer 59.

The edit mode icon 76 will be highlighted when the teacher is in the process of doing anything other than viewing the Flash readable file. This edit mode allows the teacher to delete any of his own notes 70, comments or any of the learning objective statements 33 that he has added to his layer 77.

It should be noted that all of the learning outcome statements, comments, grades and note boxes appear in the colour blue to be consistent with Andrew Campbell's associated colour on his transparent layer 77 over the student's answer 59. Andrew Campbell's learning outcome statements placeholders, comments, grades and note boxes 70 form his assessment. The assessment is placed over the student's answer 59 in or on the transparent layer 77. The transparent layer 77 may be switched off, such that the student's answer will be fully visible without being obscured by the assessment.

A second teacher may assess the student's answer independently. The second teacher's name (not shown) would appear within the drop down list 68 and his associated colour would be distinct from blue, such as red. Learning outcome statements, comments, grades and note boxes will appear in the colour red on his separate transparent layer over the student's answer 59. The assessment is placed over the student's answer 59 in a layer which may be switched off, such that the student's answer will be fully visible without being obscured by the assessment. He may also switch off or on Andrew Campbell's transparent layer 77 with his associated learning outcome statements, comments, grades and note boxes which form Andrew Campbell's assessment.

Both assessments may be displayed simultaneously.

If the teacher would like to review the student's answer 59, for example, to see the evidence in the student's answer 59 which the teacher deems fulfills the learning outcome statement 33, then the teacher simply double clicks on the learning outcome statement 33 from the list 64. Each instance in the student's answer 59 where he (or another teacher or assessor, provided all layers are switched on to be visible) has indicated that particular learning objective 33 has been met, will then automatically appear in the Flash viewer screen will then automatically. If the learning outcome statement 33 is used more than once in assessing the student's answer 59, the teacher or moderator double clicks on the outcome statement 33 again. A placeholder (not shown) identifies the part of the student's answer 59 satisfying the learning outcome statement 33 is displayed in window 60.

The teacher will save the assessment by pressing the disk icon 78 as an assessed file. The assessed file will be available to the student via the Red Pen Tool within that student's portfolio within the assessment tool 100.

Figure 8:
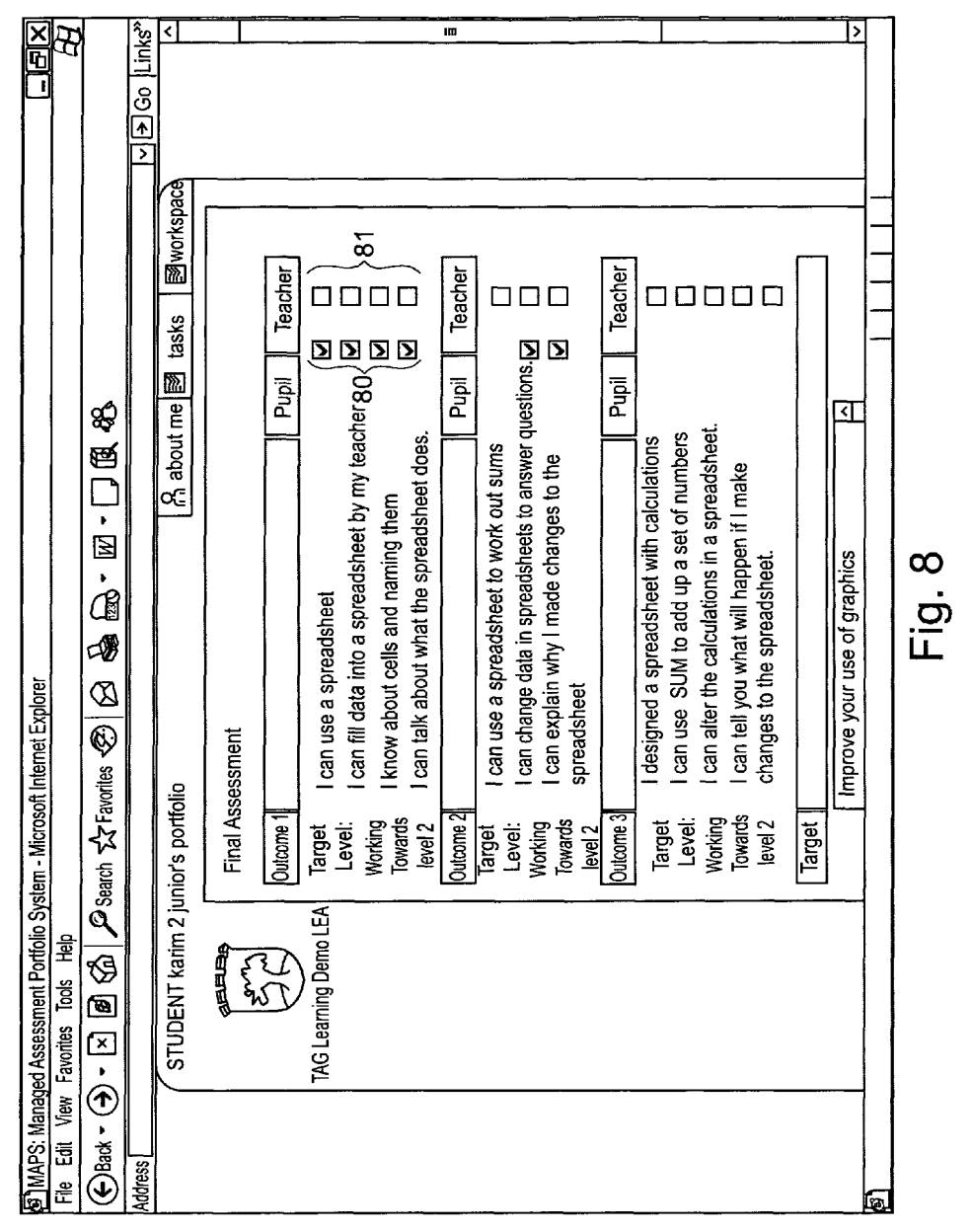

A final assessment page, shown in FIG. 8 may also be used by the student and teacher to confirm that all of the learning outcome statements 33 have been met. The final assessment page shows the learning objectives 33, each having a tick box 80, which allows the student to indicate if he believes his answer 59 meets the learning outcome statements 33. The student is often asked to assess their work against the learning outcome statements to help ensure the student has understood the coursework question and has answered all parts sufficient to meet the learning outcome statements 33. A further tick box 81 is provided for the teacher or moderator to fill in if the teacher or moderator believes the learning statement 33 has been met in the student's answer 59. The further tick box 81 will be filled in automatically if the corresponding learning outcome 33 has been dragged and dropped on to the student's answer 59. Any comments made on the student's answer 59, may also be displayed on the final assessment page.

The teacher or moderator may also open the original file 40, which will require the application or a special reader for opening the type of file the student submitted the file in, for example Word™, Excel™, Flowol™, etc.

If appropriate (deemed so either by the teacher or the examination awarding authority), a peer of the student may also assess the coursework answer in the same fashion a teacher can. The peer would be added to the list of assessors 68 and add his assessment on have a further layer in a further colour to differentiate his assessment from the other assessors.

The Red Pen Tool™ 61 may be used as a stand alone tool, and in this stand alone version, users will be able to create coursework questions and set learning objectives for these questions, and then 'assign' these questions to a number of individuals that they choose (in a similar fashion to what is available within the assessment tool 100). For the purpose of this stand alone tool example, we will continue to talk about teachers and students.

It is envisaged that the stand alone version of the Red Pen Tool will be available as a web based tool on a domain name, such as www.redpentool.com, where users can pay by credit card to access the Red Pen Tool in order to 'mark' a set number of files. Once the user has successfully had their credit card verified and paid for whatever number of files that they want to assess, then the user will be able to set up a user name and password and have access to their own Red Pen Tool area where they will have certain administrative rights, including to: create their own coursework question—which will automatically generate a unique url that will be emailed to students and which they can determine whether is password protected or not. The user must then include a list of the email recipients who he would like to receive this unique url. The user will be able to establish the learning objectives for this task and set a hand in date. The user will be able to determine how this coursework question will be marked using the preset scales or a cumulative numeric scoring mechanism.

Figure 10:
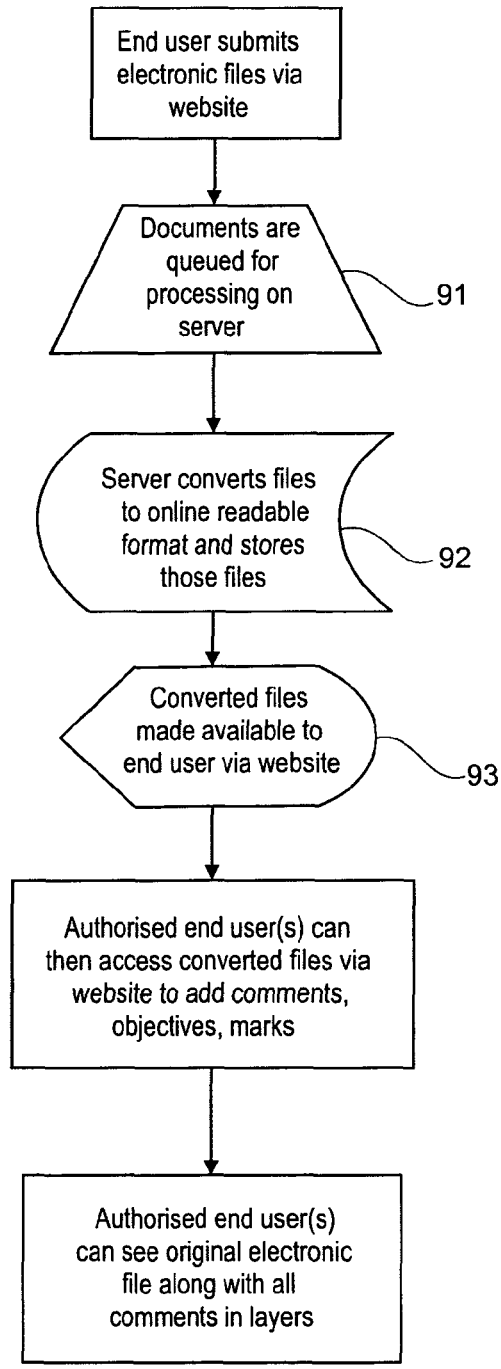
FIG. 10 is a flow diagram setting out some steps in a method in accordance with the present invention.

FIG. 10 shows the process of how files are received and processed by the Red Pen Tool. After logging in, setting up and assigning the task, individuals invited by the paying user will be able to directly 'hand in' their work via the unique url that they are supplied. Handing in work in this way simply takes a copy of the original file which is then scanned and virus checked and saved onto the storage server. These invited individuals (students, in this example) will be able to upload a copy of the original file(s) containing their completed work for the assigned task using a wizard within the tool (at the url that they are provided). Once a copy of the original files are uploaded, they will be saved onto our storage server 19. Any files that have been uploaded into the tool are queued in a queue 91 and then go through the Flash conversion process 92 which will be automated on a server. The assessor will log back in and will have access to these Flash readable files 93 through a viewer and assess the coursework answers in the way as described with reference to FIG. 9.

The user will pay a fee for a set number of files he wishes to assess, for example, for a number of files that will be converted and made available via the Red Pen Tool for assessment, The assessed and/or moderated file would then be available for the student to view within the Red Pen Tool™ 61.

If the assessment of the coursework answer includes a numeric mark, then a cumulative score will automatically be returned once the user completes and saves his marking, such as the marking schedule 82.

The student will be notified by email that they can also revisit the unique url to see their assessed coursework answer.

The learning outcome statements may be measured against National Curriculum level targets (and the language is either pulled by teachers directly from the National Curriculum, or rewritten, with teachers and advisors, in pupil-friendly language) or are set by an Awarding Body for general or vocational qualifications. Students have complete access to these learning outcome statements so that they know what their teacher is expecting of them.

Figure 15:
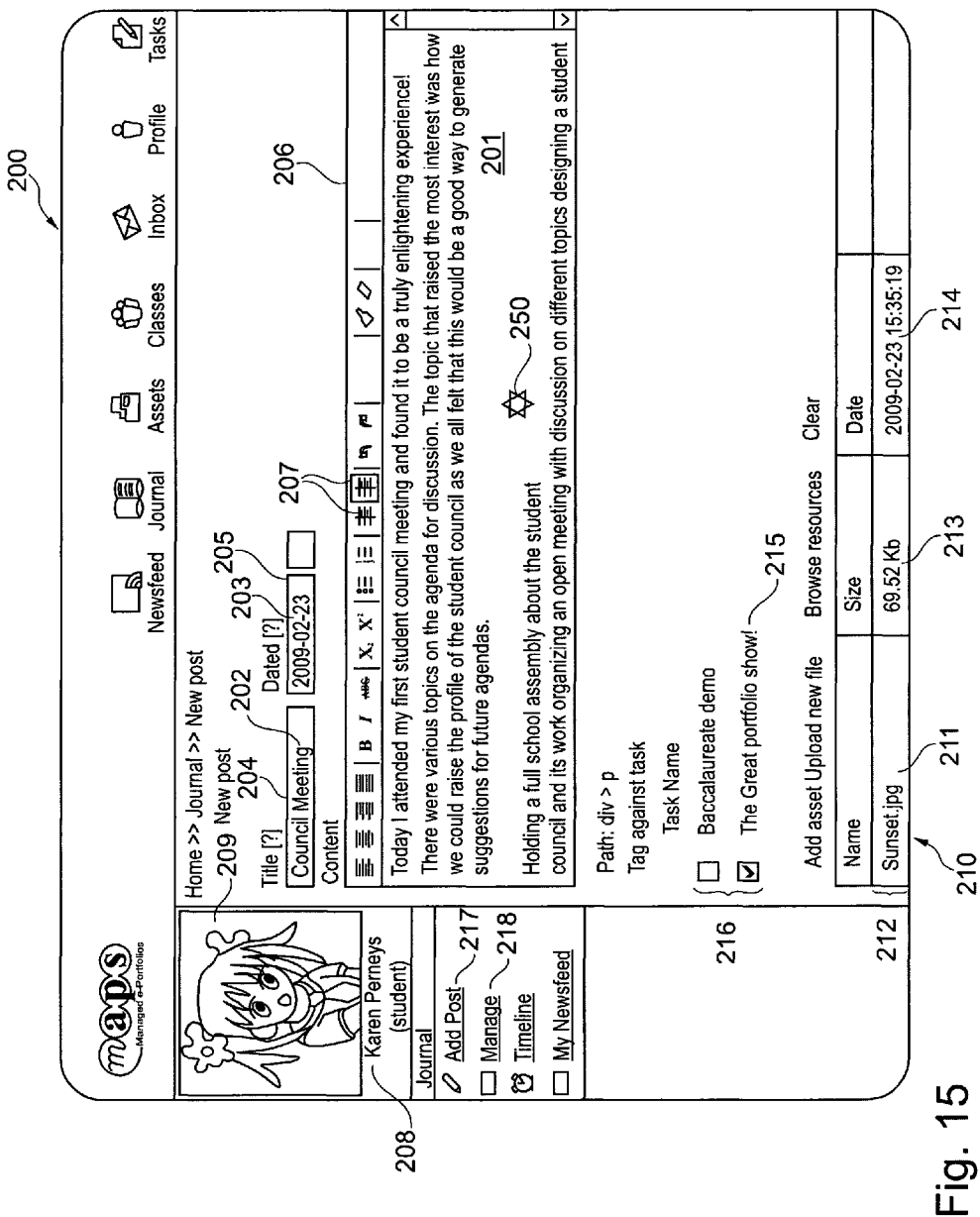
FIG. 15 is a screenshot from an assessment tool displaying a coursework answer in the form of a diary entry as viewed by a student in a method in accordance with the present invention.

FIG. 15 is a screenshot from an assessment tool, generally identified by reference numeral 200. The assessment tool 200 is shown displaying a coursework answer in the form of a diary entry 201 as viewed by a student in a step in a method in accordance with the present invention. The diary entry 201 is mapped to a title 202, appearing in title field 204. The diary entry 201 is also mapped to a date 203 appearing in a date field 205. The diary entry 201 is in text editable form, editing of which is facilitated using a bar 206 comprising editing buttons 207. The students name 208 and identifying picture 209 appear on the left side of the screen 210. A diary entry asset 211 may be appended to the diary entry 201 in list 212. The diary entry asset 211 may be a file in any format, such as Microsoft Excel™, PowerPoint™, Flowol™, etc. and be part of the coursework answer. Indications of the size of the diary entry asset 211 is displayed in a field 213 and a date indicating when the diary entry asset was last edited or append to the diary entry 201 appears in a date field 214. The diary entry 201 may be tagged against a particular coursework question 215 from a list of coursework question 216 assigned to the student. A new diary entry may be made by clicking on the "add post" button 217.

Figure 16:
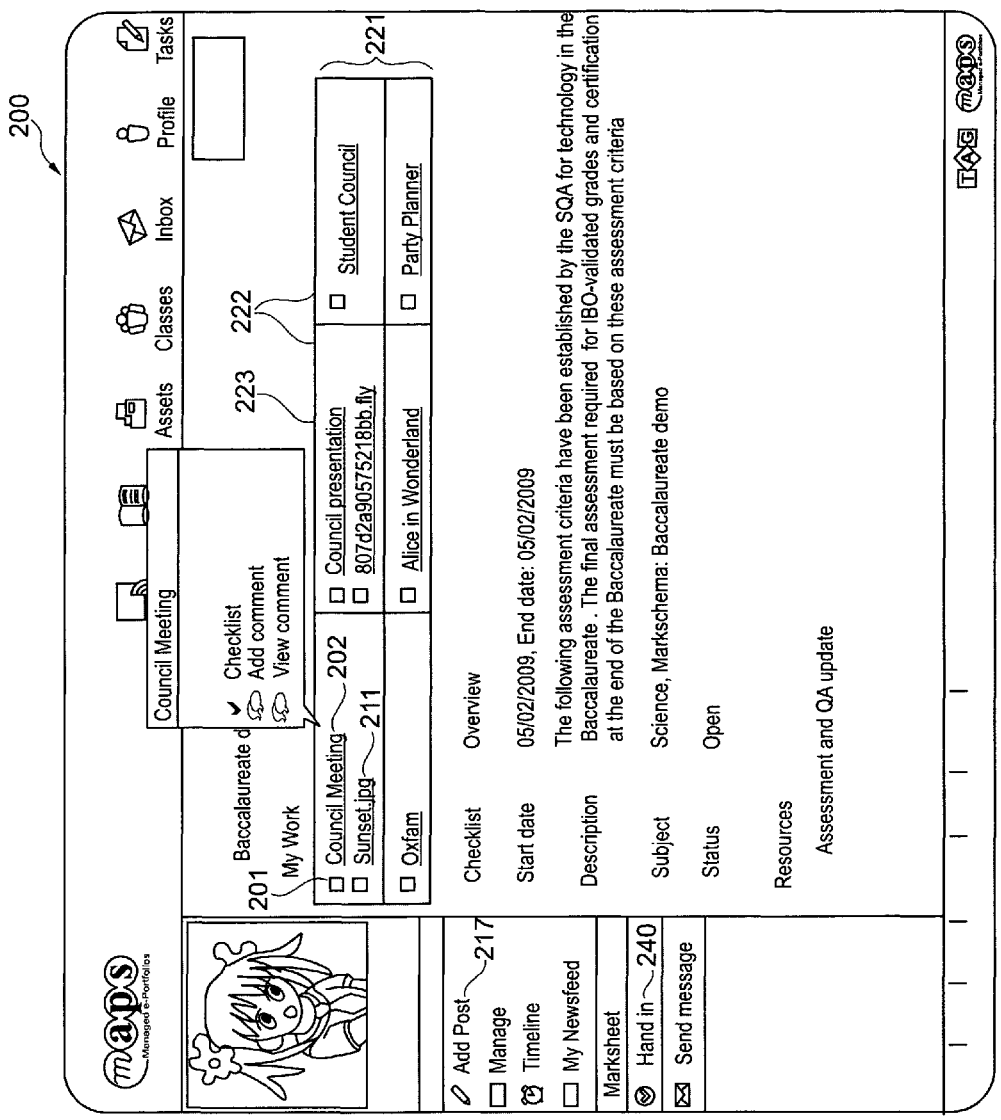
FIG. 16 is a screenshot from the assessment tool of FIG. 15 showing a list of diary entries and a balloon with an option list comprising a checklist button.
Figure 18:
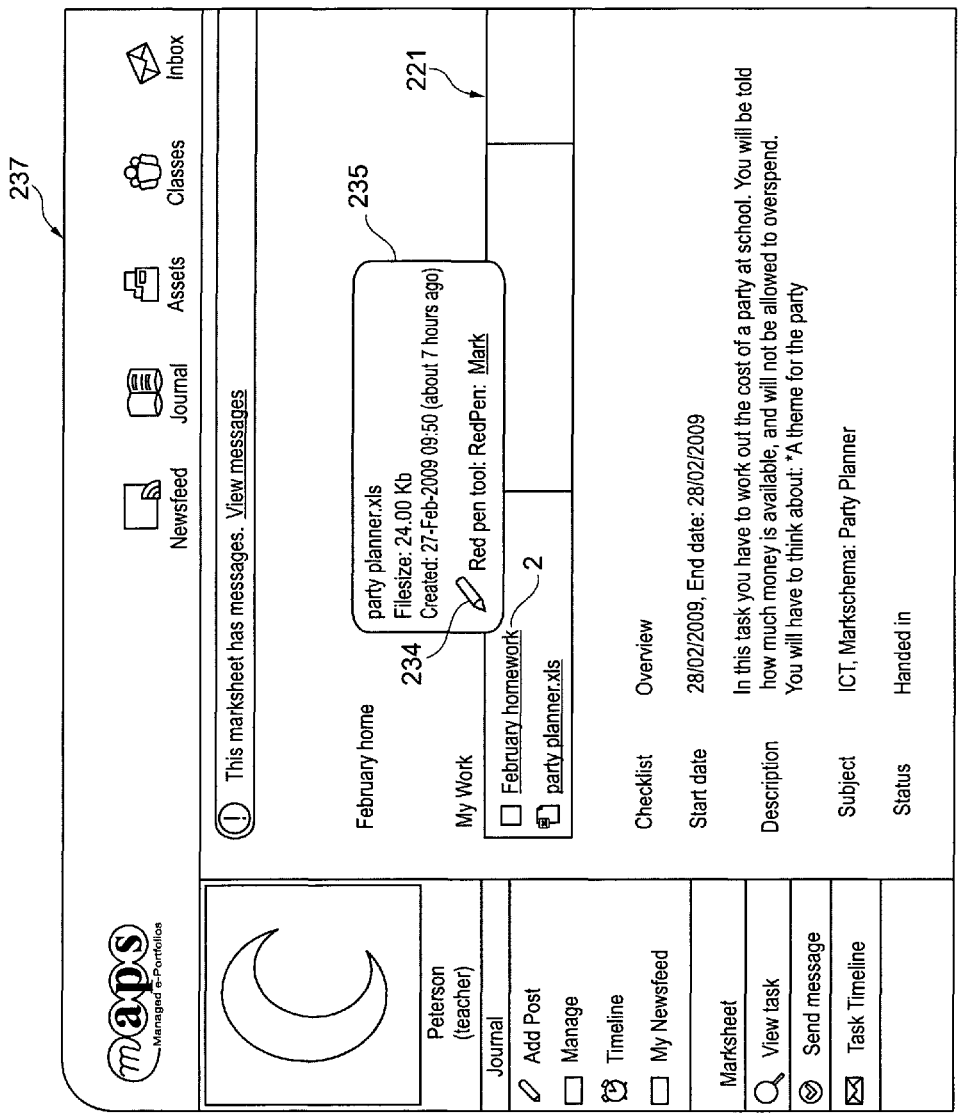
FIG. 18 is a screenshot of a coursework answer in the form of a date filtered range of diary entries and a diary entry asset submitted to a teacher ready for assessing.

A mouse pointer (not shown) is navigated to the button 218 and a mouse button (not shown) depressed to navigate to the screenshot 220 shown in FIG. 16, which shows a diary entry table 221, comprising a number of diary entry titles 222, such as diary entry title 202. Each diary entry 222 is wrapped in a box 223. Each box 223 has a list of any diary entry assets 211 appended to the respective diary entry title 222. Clicking on the diary entry title 202 opens the associated diary entry 201. The diary entry table 221 may be collapsible and expandable and have a scroll bar (not shown) to facilitate scrolling through the list of diary entries. Each diary entry title 222 has an associated collapsible balloon, which is expandable by depressing a right key of a standard mouse (not shown).

Collapsible balloon 225 is tagged to the diary entry title 221 entitled "Council Meeting". The collapsible balloon 225 comprises a list of three buttons: a checklist button 226; an add comment button 227; and a view comment button 228. The add comment button 227 allows the student or a teacher to tag a comment to the diary entry 201. The view comment button 228 allows the student or the teacher to view any comments which have been made using the button 227. The checklist button 226 navigates the user to a list of objectives 230. A list of objectives 230 relating to the course work question is shown in FIG. 17. Clicking on one of the objectives 229 from the list of objectives will assign or map that objective to the diary entry 201. The student or the teacher can assign or map the objective to the diary entry.

The student then "hands-in" the course work answer to the teacher for assessment.

The step of assessment may include the step of marking, to produce an assessed file. The course work answer may comprise a single diary entry; the entire diary; or a selection of diary entries, perhaps filtered by a date range. The teacher then assesses the coursework answer from the teachers assessment tool 237, preferably using the Red Pen Tool® in a method described herein with reference to FIG. 9. The Red Pen Tool® is selected by a teacher, from an icon 234 in a balloon 235, which appears upon right clicking a mouse button (not shown) when the mouse pointer (not shown) hovers over the file icon 236. Any diary entry 201 and diary entry asset 211 is converted to a common electronic format, preferably using a Flash converter and the Red Pen Tool® is used to assess the diary entry asset 211 in the same way as described herein with reference to FIG. 9. The teacher assesses the coursework answer using the steps of: dragging and dropping an objective from a list of objectives from a window 64 on to the diary entry, which leaves a placeholder on the diary entry at the point evidencing fulfillment of that objective; dragging and dropping comment balloons on to a point on the diary entry and entering comments into the balloons; highlighting areas of the coursework answer; and placing marks on the coursework answer.

Alternatively, the diary entry assets 211 are assessed using the Red Pen Tool® and the diary entry 201 is assessed by dragging and dropping an objective from a list of objectives from a pop up window (not shown) on to the diary entry 201 leaving a placeholder 250; dragging and dropping comment balloons from an assessment tool bar (not shown) on to a point on the diary entry and entering comments into the balloons; highlighting areas of the coursework answer, the highlighting function button on the assessment tool bar (not shown); and placing marks on the coursework answer, using drag and drop grade icons on the assessment tool bar (not shown) to grade the course work answer.

Once the teacher has assessed the coursework answer, the assessed file is sent back to the student and/or on to another user, such as a moderator, another teacher or for pier review. The student and/or another user can view the assessed coursework answer.

The assessed file or files are added to the list appearing in table 221 as assessed files. If the assessed file was assessed in the Red Pen Tool® the assessed file will be viewable in a Flash reader. When viewing the assessed file in a Flash reader, placeholders and any notes remain on a layer which can be switched on and off to reveal any parts of the diary entry asset 211 which is obscured by placeholder 250 and any comment balloons or fields.

Figure 19:
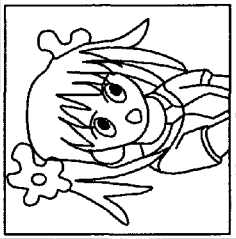
FIG. 19 is a screenshot which appears when the user has chosen an objective in the list of objectives shown in FIG. 17, the screenshot showing a list of diary entries and appended files which have been tagged with the chosen objective.

The user can navigate to the list of objectives 230 and pick an objective, such as 231. The screen turns opaque, revealing a list of the diary entries and diary entry assets which fulfill the objective 231, in this case, the diary entry entitled "February homework" 232 and the diary entry asset entitled "partyplanner.xls" 233, as shown in FIG. 19. The user clicks on the title "February work" 232 to open the diary entry and preferably, the portion of the diary entry on which the tagged placeholder relating to the objective is displayed, so that the user can see the evidence of fulfillment of the objective. The user clicks on the title "partyplanner.xls" 232 to open the diary entry asset in the Red Pen Tool® and preferably, the portion of the diary entry on which the tagged placeholder relating to the objective is displayed, so that the user can see the evidence of fulfillment of the objective. Thus a user, such as a moderator can review the assessment of the coursework answer very quickly, efficiently and accurately.

The invention claimed is:

1. A system for facilitating review of an assessed coursework answer, the system comprising:
    a computer and a display for displaying the coursework answer, the computer performing the following steps:
        executing a computer program which converts the coursework answer into a common electronic format to create a coursework file to allow the coursework answer to be read using a common reader to display a representation of the coursework answer;
        displaying at least part of the representation of the coursework answer on the display;
        displaying a list of learning outcome statements; and
        inputting, from a user, a selection of a learning outcome statement from the list of learning outcome statements and placing the learning outcome statement in a separate layer on the representation of the coursework answer at a location evidencing fulfillment of the learning outcome statement to produce an assessed coursework answer; and
    a reviewer having a review computer with a review visual display, the review computer for displaying at least part of a representation of a coursework answer on the review visual display, the review computer performing the following steps:
        displaying a list of learning outcome statements answer on the review visual display; and
        inputting, from the reviewer, a learning outcome statement from said list of learning outcome statements;
        locating the learning outcome statement on the coursework answer evidencing fulfillment of the leaning outcome statement; and
        displaying the part of the coursework answer which evidences fulfillment of the learning outcome statement.

2. A system in accordance with claim 1, wherein the separate layer is switchable to view the learning outcome statement and to hide the separate layer such that the representation is viewable without viewing said outcome statement.

3. A system in accordance with claim 1, wherein an assessor icon is displayed, the computer further performing the step of activating the assessor icon to reveal a list of assessors.

4. A system in accordance with claim 3, wherein each assessor listed in said list of assessors has a color associated therewith, the outcome statement placed on the representation of the coursework answer appearing in said color.

5. A system in accordance with claim 1, wherein a note icon is displayed, the computer further performing the step of activating or dragging and dropping the note icon on to a specific point on the representation of the coursework answer and leaving a note.

6. A system in accordance with claim 5, wherein the note is wrapped into a box, said box being openable when activated.

7. A system in accordance with claim 1, wherein a comment icon is displayed, the computer further performing the step of activating or dragging and dropping the comment icon on to a specific point on the representation of the coursework answer and leaving a comment.

8. A system in accordance with claim 7, wherein the comment is wrapped into a box, said box being openable when activated.

9. A system in accordance with claim 1, wherein a highlighter icon is displayed, the computer further performing the step of activating the highlighter icon on highlighting a specific area on the representation of the coursework answer.

10. A system in accordance with claim 1, wherein said common electronic format is a Flash readable file.

11. A system in accordance with claim 10, the computer further performing step of activating said coursework file to display said representation of the coursework answer and displaying a window requesting acceptance of said representation for submission.

12. A system in accordance with claim 1, wherein the coursework answer is the form of a diary comprising at least two selections of diary entries, the at least two selections of diary entries having been assessed independently of each other.

13. A system for facilitating review of an assessed coursework answer, the system comprising:
    a computer and a display for displaying the coursework answer, the computer performing the following steps:
        executing a computer program which converts the coursework answer into a common electronic format to create a coursework file to allow the coursework answer to be read using a common reader to display a representation of the coursework answer;
        displaying at least part of the representation of the coursework answer on the display;
        displaying a list of learning outcome statements; and
        inputting, from a user, a selection of a learning outcome statement from the list of learning outcome statements and placing a symbol representing the learning outcome statement in a separate layer on the representation of the coursework answer at a location evidencing fulfillment of the learning outcome statement to produce an assessed coursework answer;
    a reviewer having a review computer with a review visual display, the review computer for displaying at least part of a representation of a coursework answer on the review visual display, the review computer performing the following steps:
        displaying a list of learning outcome statements on the review visual display; and
        inputting, from the reviewer, a learning outcome statement from said list of learning outcome statements;
        locating the learning outcome statement on the coursework answer evidencing fulfillment of the leaning outcome statement; and
        displaying the part of the coursework answer which evidences fulfillment of the learning outcome statement.

14. A system in accordance with claim 13, wherein said layer switchable to view said symbols representing the learning outcome statement and to hide said layer such that the representation is viewable without said symbols representing said learning outcome statement.

15. A system in accordance with claim 13, wherein an assessor icon is displayed, the computer further performing the step of activating the assessor icon to reveal a list of assessors.

16. A system in accordance with claim 15, wherein each assessor listed in said list of assessors has a color associated therewith, the outcome statement placed on the representation of the coursework answer appearing in said color.

17. A system in accordance with claim 13, wherein a note icon is displayed, the computer further performing the step of activating or dragging and dropping the note icon on to a specific point on the representation of the coursework answer and leaving a note.

18. A system in accordance with claim 17, wherein the note is wrapped into a box, said box being openable when activated.

19. A system in accordance with claim 13, wherein a comment icon is displayed, the computer further performing the step of activating or dragging and dropping the comment icon on to a specific point on the representation of the coursework answer and leaving a comment.

20. A system in accordance with claim 19, wherein the comment is wrapped into a box, said box being openable when activated.

21. A system in accordance with claim 13, wherein a highlighter icon is displayed, the computer further performing the step of activating the highlighter icon on highlighting a specific area on the representation of the coursework answer.

22. A system in accordance with claim 13, wherein said common electronic format is a Flash readable file.

23. A system in accordance with claim 22, the computer further performing the step of activating said coursework file to display said representation of the coursework answer and displaying a window requesting acceptance of said representation for submission.

24. A system in accordance with claim 13, wherein the coursework answer is the form of a diary comprising at least two selections of diary entries, the at least two selections of diary entries having been assessed independently of each other.

* * * * *